(12) United States Patent
Olabiyi et al.

(10) Patent No.: US 11,468,246 B2
(45) Date of Patent: Oct. 11, 2022

(54) MULTI-TURN DIALOGUE RESPONSE GENERATION WITH TEMPLATE GENERATION

(71) Applicant: Capital One Services, LLC, McLean, VA (US)

(72) Inventors: Oluwatobi Olabiyi, Arlington, VA (US); Erik T. Mueller, Chevy Chase, MD (US); Diana Mingels, Washington, DC (US); Zachary Kulis, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 141 days.

(21) Appl. No.: 16/936,105

(22) Filed: Jul. 22, 2020

(65) Prior Publication Data

US 2021/0027025 A1 Jan. 28, 2021

Related U.S. Application Data

(60) Provisional application No. 62/877,076, filed on Jul. 22, 2019.

(51) Int. Cl.
*G06F 40/56* (2020.01)
*G06F 40/35* (2020.01)
(Continued)

(52) U.S. Cl.
CPC ............ *G06F 40/56* (2020.01); *G06F 40/284* (2020.01); *G06F 40/35* (2020.01); *G06K 9/6257* (2013.01);
(Continued)

(58) Field of Classification Search
CPC ........ G06F 40/284; G06F 40/35; G06F 40/56; G06N 3/049; G06N 20/00; G06K 9/6257;
(Continued)

(56) References Cited

U.S. PATENT DOCUMENTS 6,721,706 B1 * 4/2004 Strubbe ................... G10L 15/18
704/E15.04
7,853,557 B2 * 12/2010 Schneider ........... G06F 16/3337
707/608
(Continued)

FOREIGN PATENT DOCUMENTS

CN 110046248 A 7/2019
CN 110083826 A 8/2019

OTHER PUBLICATIONS

Wang, F., "Building high-performance distributed systems with synchronized clocks", 2019, Available from ProQuest Dissertations and Theses Professional. Retrieved from https://dialog.proquest.com/professional/docview/2467863602?accountid=131444 (Year: 2019).*

(Continued)

*Primary Examiner* — Eric Yen
(74) *Attorney, Agent, or Firm* — Banner & Witcoff, Ltd.

(57) ABSTRACT

Machine classifiers in accordance with embodiments of the invention capture long-term temporal dependencies in particular tasks, such as turn-based dialogues. Machine classifiers may be used to help users to perform tasks indicated by the user. When a user utterance is received, natural language processing techniques may be used to understand the user's intent. Templates may be determined based on the user's intent in the generation of responses to solicit information from the user. A variety of persona attributes may be determined for a user. The persona attributes may be determined based on the user's utterances and/or provided as metadata included with the user's utterances. A response persona may be used to generate responses to the user's utterances such that the generated responses match a tone appropriate to the task. A response persona may be used to (Continued)

generate templates to solicit additional information and/or generate responses appropriate to the task.

20 Claims, 11 Drawing Sheets

(51) Int. Cl.
| | |
|---|---|
| G06N 3/04 | (2006.01) |
| G10L 15/22 | (2006.01) |
| G10L 15/06 | (2013.01) |
| G10L 15/16 | (2006.01) |
| G06N 20/00 | (2019.01) |
| G06K 9/62 | (2022.01) |
| G06F 40/284 | (2020.01) |

(52) U.S. Cl.
CPC ........... *G06K 9/6262* (2013.01); *G06N 3/049* (2013.01); *G06N 20/00* (2019.01); *G10L 15/063* (2013.01); *G10L 15/16* (2013.01); *G10L 15/22* (2013.01); *G10L 2015/0631* (2013.01); *G10L 2015/228* (2013.01)

(58) Field of Classification Search
CPC ................ G06K 9/6262; G10L 15/063; G10L 2015/0631; G10L 15/16; G10L 15/22; G10L 2015/228
See application file for complete search history.

(56) References Cited

U.S. PATENT DOCUMENTS

| | | | |
|---|---|---|---|
| 9,473,637 B1 * | 10/2016 | Venkatapathy | G06F 40/216 |
| 10,664,527 B1 | 5/2020 | Henderson et al. | |
| 10,860,629 B1 | 12/2020 | Gangadharaiah et al. | |
| 10,872,299 B2 | 12/2020 | Wayne et al. | |
| 10,978,056 B1 * | 4/2021 | Chai | G06F 16/3344 |
| 11,200,885 B1 | 12/2021 | Mandal et al. | |
| 2009/0150156 A1 * | 6/2009 | Kennewick | G01C 21/3608 |
| | | | 704/275 |
| 2011/0060587 A1 | 3/2011 | Phillips et al. | |
| 2012/0221860 A1 | 8/2012 | Hoornaert et al. | |
| 2014/0222436 A1 * | 8/2014 | Binder | G10L 21/16 |
| | | | 704/275 |
| 2014/0358890 A1 * | 12/2014 | Chen | G06F 16/9535 |
| | | | 707/710 |
| 2018/0181673 A1 * | 6/2018 | Liu | G06F 16/243 |
| 2018/0203852 A1 | 7/2018 | Goyal et al. | |
| 2018/0293462 A1 | 10/2018 | Ambati et al. | |
| 2019/0266236 A1 | 8/2019 | Battach et al. | |
| 2019/0341036 A1 | 11/2019 | Zhang et al. | |
| 2019/0385595 A1 | 12/2019 | Wabgaonkar et al. | |
| 2020/0125992 A1 | 4/2020 | Agarwal et al. | |
| 2020/0175374 A1 | 6/2020 | Hestness et al. | |
| 2020/0202887 A1 * | 6/2020 | Modi | G06N 3/0454 |
| 2021/0056270 A1 * | 2/2021 | Farhan | G06F 40/56 |
| 2021/0232773 A1 | 7/2021 | Wang et al. | |

OTHER PUBLICATIONS

Iulian V. Serban et al, A Hierarchical Latent Variable Encoder-Decoder Model for Generating Dialogues, arXiv:1605.06069v3 [cs.CL] Jun. 14, 2016.
Alec Radford et al, Language Models are Unsupervised Multitask Learners, OpenAI Blog 1.8, 2019.
Alec Radford et al, Improving Language Understanding by Generative Pre-Training, 2018.
Kishore Papineni et al, BLEU: a Method for Automatic Evaluation of Machine Translation, Proceedings of the 40th Annual Meeting of the Association for Computational Linguistics (ACL), Philadelphia, Jul. 2002, pp. 311-318.
Oluwatobi Olabiyi et al, Multi-turn Dialogue Response Generation in an Adversarial Learning Framework, arXiv:1805.11752v5 [cs.CL] Jun. 26, 2019.
Oluwatobi Olabiyi et al, An Adversarial Learning Framework for a Persona-Based Multi-Turn Dialogue Model, arXiv:1905.01992v2 [cs.CL] Jun. 26, 2019.
Oluwatobi O. Olabiyi et al, Adversarial Bootstrapping for Dialogue Model Training, arXiv:1909.00925v2 [cs CL] Sep. 4, 2019.
Oluwatobi O. Olabiyi et al, A Persona-based Multi-turn Conversation Model in an Adversarial Learning Framework, arXiv:1905.01998v1 [cs.CL] Apr. 29, 2019.
Ryan Lowe et al, The Ubuntu Dialogue Corpus: A Large Dataset for Research in Unstructured Multi-Turn Dialogue Systems, arXiv:1506.08909v3 [cs.CL] Feb. 4, 2016.
Chin-Yew Lin, ROUGE: A Package for Automatic Evaluation of Summaries, Association for Computational Linguistics, Jul. 2004.
Jiwei Li et al, Deep Reinforcement Learning for Dialogue Generation, arXiv:1606.01541v4 [cs.CL] Sep. 29, 2016.
Jiwei Li et al, Adversarial Learning for Neural Dialogue Generation, arXiv:1701.06547v5 [cs.CL] Sep. 24, 2017.
Jiwei Li et al, A Diversity-Promoting Objective Function for Neural Conversation Models, arXiv:1510.03055v3 [cs.CL] Jun. 10, 2016.
Alex Lamb et al, Professor Forcing: A New Algorithm for Training Recurrent Networks, arXiv:1610.09038v1 [stat.ML] Oct. 27, 2016.
Ilya Sutskever et al, Sequence to Sequence Learning with Neural Networks, arXiv:1409.3215v3 [cs.CL] Dec. 14, 2014.
Ari Holtzman et al, The Curious Case of Neural Text Degeneration, arXiv:1904.09751v1 [cs.CL] Apr. 22, 2019.
Jacob Devlin et al, BERT: Pre-training of Deep Bidirectional Transformers for Language Understanding, arXiv:1810.048052v2 [cs.CL] May 24, 2019.
Zihang Dai et al, Transformer-XL: Attentive Language Models Beyond a Fixed-Length Context, arXiv:1901.02860v3 [cs.LG] Jun. 2, 2019.
Saizheng Zhang et al, Personalizing Dialogue Agents: I have a dog, do you have pets too?, arXiv:1801.07243v5 [cs.AI] Sep. 25, 2018.
Yizhe Zhang et al, Generating Informative and Diverse Conversational Responses via Adversarial Information Maximization, arXiv:1809.05972v5 [cs.CL] Nov. 6, 2018.
Rowan Zellers et al, Defending Against Neural Fake News, arXiv:1905.12616v1 [cs.CL] May 29, 2019.
Zhilin Yang et al, XLNet: Generalized Autoregressive Pretraining for Language Understanding, arXiv:1906.08237v1 [cs.CL] Jun. 19, 2019.
Chen Xing et al, Hierarchical Recurrent Attention Network for Response Generation, arXiv:1701.07149v1 [cs.CL] Jan. 25, 2017.
Ronald J. Williams et al, A Learning Algorithm for Continually Running Fully Recurrent Neural Networks, Neural Computation, 1, pp. 270-280, 1989.
Oriol Vinyals, A Neural Conversational Model, arXiv:1506.05869v3 [cs.CL] Jul. 22, 2015.
Ashish Vaswani et al, Attention is All You Need, arXiv:1706.03762v5 [cs.CL] Dec. 6, 2017.
Yu Sun et al, ERNIE: Enhanced Representation through Knowledge Integration, arXiv:1904.09223v1 [cs.CL] Apr. 19, 2019.
Yu Sun et al, ERNIE 2.0: A Continual Pre-Training Framework for Language Understanding, arXiv:1907.12412V1 [cs.CL] Jul. 29, 2019.
Iulian Vlad Serban et al, Multiresolution Recurrent Neural Networks: An Application to Dialogue Response Generation, arXiv:1606.00776V2 [cs.CL] Jun. 14, 2016.
Iulian V. Serban et al, Building End-to-End Dialogue Systems Using Generative Hierarchical Neural Network Models, arXiv:1507.048083 [cs.CL] Apr. 6, 2016.
Pawel Budzianowski et al, Hello, It's GPT-2—How Can I Help You? Towards the Use of Pretrained Language Models for Task-Oriented Dialogue Systems, arXiv:1907.05774v2 [cs.CL] Aug. 4, 2019.
Pawel Budzianowski et al, MultiWOZ—A Large-Scale Multi-Domain Wizard-of-Oz Dataset for Task-Oriented Dialogue Modelling, arXiv:1810.00278v3 [cs.CL] Apr. 20, 2020.

(56) References Cited

OTHER PUBLICATIONS

Whenhu Chen et al, Semantically Conditioned Dialog Response Generation via Hierarchical Disentangled Self-Attention, arXiv:1905.12866v3 [cs.CL] Jun. 9, 2019.

Donghoon Ham et al, End-to-End Neural Pipeline for Goal-Oriented Dialogue Systems Using gpt-2, Proceedings of the 58th Annual Meeting of the Association for Computational Linguistics, pp. 583-592, Jul. 5-10, 2020, © 2020 Association for Computational Linguistics.

Ehsan Hosseini-Asl et al, A Simple Language Model for Task-Oriented Dialogue, arXiv:2005.00796v3 [cs.CL] Jul. 7, 2020.

Young-Bum Kim et al, OneNet: Joint Domain, Intent, Slot Prediction for Spoken Language Understanding, arXiv:1801.05149V1 [cs.CL] Jan. 16, 2018.

Sungjin Lee et al, ConvLab: Multi-Domain End-to-End Dialog System Platform, arXiv:1904.08637v1 [cs.CL] Apr. 18, 2019.

Hwaran Lee et al, SUMBT: Slot-Utterance Matching for Universal and Scalable Belief Tracking, arXiv:1907.07421v1 [cs.CL] Jul. 17, 2019.

Shikib Mehri et al, Structured Fusion Networks for Dialog, arXiv:1907.10016v1 [cs.CL] Jul. 23, 2019.

Oluwatobi O. Olabiyi et al, DLGNet: A Transformer-based Model for Dialogue Response Generation, arXiv:1908.01841V2 [cs.CL] Sep. 4, 2019.

Jiahuan Pei et al, A Modular Task-oriented Dialogue System Using a Neural Mixture-of-Experts, arXiv: 1907.05346v1 [cs CL] Jul. 10, 2019.

Baolin Peng et al, SOLOIST: Few-shot task-oriented dialog with a Single Pre-trained Auto-regressive Model, arXiv:2005.05298V3 [cs.CL] Jun. 22, 2020.

Alec Radford et al, Language Models are Unsupervised Multitask Learners, https://d4mucfpksywv.cloudfront.net/better-languagemodels, 2019.

Osman Ramadan et al, Large-Scale Multi-Domain Belief Tracking with Knowledge Sharing, arXiv:1807.06517v1 [cs.CL] Jul. 17, 2018.

Tsung-Hsien Wen et al, Semantically Conditioned LSTM-based Natural Language Generation for Spoken Dialogue Systems, arXiv:1508.01745v2 [cs.CL] Aug. 26, 2015.

Jason Williams et al, The Dialog State Tracking Challenge, Proceedings of the SIGDIAL 2013 Conference, pp. 404-413, Metz, France, Aug. 22-24, 2013, © 2013 Association for Computational Linguistics.

Yizhe Zhang et al, DialoGPT: Large-Scale Generative Pre-training for Conversational Response Generation, arXiv:1911.00536v3 [cs.CL] May 2, 2020.

Tiancheng Zhao et al, Rethinking Action Spaces for Reinforcement Learning in End-to-end Dialog Agents with Latent Variable Models, acarXiv: 1902.08858v2 [cs.CL] Apr. 15, 2019.

Sordoni, Alessandro, et al. "A hierarchical recurrent encoder-decoder for generative context-aware query suggestion" proceedings of the 24th ACM international on conference on information and knowledge management, 2015, pp. 553-562.

Cheng et al., "Long short-term memory-networks for machine reading" arXiv preprint arXiv: 1601.06733, 2016, 10 pages.

Chen et al. "Sequential matching model for end-to-end multi-turn response selection" In ICASSP 2019 IEEE International Conference on Acoustics, Speech and Signal Processing (ICASSP) pp. 7350-7354.

* cited by examiner

MULTI-TURN DIALOGUE RESPONSE GENERATION WITH TEMPLATE GENERATION

CROSS-REFERENCE TO RELATED APPLICATIONS

The instant application claims priority to U.S. Provisional Patent Application No. 62/877,076, titled "Multi-Turn Dialogue Response Generation with Autoregressive Transformer Models" and filed Jul. 22, 2019, the disclosure of which is hereby incorporated by reference in its entirety.

TECHNICAL FIELD

The present disclosure is generally related to the generation of automated responses to user input.

BACKGROUND

Computer generated responses to user input such as dialogue, images, and the like, are often limited in diversity and/or not particularly relevant to the user input. For example, computer generated responses to user input such as dialogue in conventional systems may include phrases such as "I don't know," "I'm sorry," and "I don't know what you are talking about," that are safe, limited in diversity, and not particularly relevant to the topic of the conversation.

While advances in machine learning, especially within deep neural networks, have enabled new capacity for machines to learn behavior from repository human behavioral data, existing neural network architecture and/or methodology continue to produce computer generated responses to user input that are limited in diversity and/or not particularly relevant to the topic of the input data. Aspects described herein may address these and other problems, and generally improve the quality and capabilities of machine classifiers trained to perform classification tasks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems described herein may use transformer-based machine classifiers to perform a variety of natural language understanding tasks including, but not limited to sentence classification, named entity recognition, sentence similarity, and question answering. The exceptional performance of transformer-based language models is due to their ability to capture long-term temporal dependencies in input sequences.

Machine classifiers in accordance with embodiments of the invention capture long-term temporal dependencies in the dialogue data better than the existing recurrent neural network-based architectures. Additionally, machine classifiers may model the joint distribution of the context and response as opposed to the conditional distribution of the response given the context as employed in sequence-to-sequence frameworks. Machine classifiers in accordance with embodiments further append random paddings before and/or after the input data to reduce the syntactic redundancy in the input data, thereby improving the performance of the machine classifiers for a variety of dialogue-related tasks. The random padding of the input data may further provide regularization during the training of the machine classifier and/or reduce exposure bias. In a variety of embodiments, the input data may be encoded based on subword tokenization.

Machine classifiers may also be used to help users to perform a particular task such as making a hotel, restaurant, or flight reservation. When a user utterance is received, natural language processing techniques may be used to understand the user's intent. Additionally, other information provided by the user may be used to understand the user's intent. Additionally, target slots may be identified in the user's utterances, where the target slots identify concepts provided by the user. The corresponding entities may be determined for the target slots based on the user's utterances. Templates may be determined based on the user's intent to aid in the identification of target slots and to guide the generation of responses to the user's utterances to solicit information from the user.

A variety of persona attributes may be determined for a user. In several embodiments, the persona attributes may be determined based on the user's utterances and/or provided as metadata included with the user's utterances. The persona attributes may identify a variety of characteristics of the user. Based on the user's persona and/or task, a response persona may be determined. The response persona may be used to generate responses to the user's utterances such that the generated responses match a tone appropriate to the task. Additionally, the response persona may be used to generate templates to solicit additional information and/or generate responses appropriate to the task.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
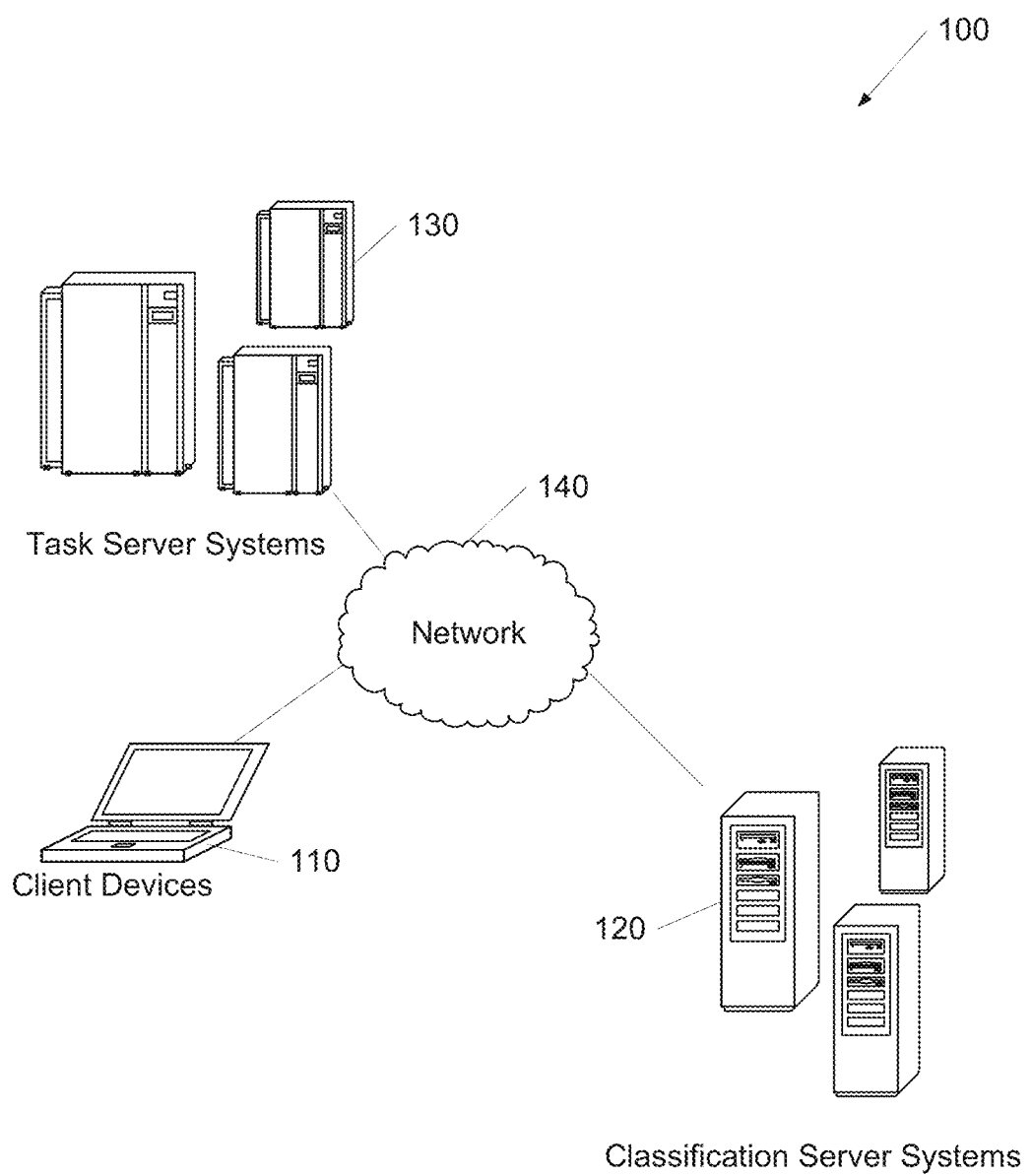
FIG. 1 shows an example of an operating environment in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for training machine classifiers to perform multiple tasks and generating responses. Conventional systems for generating responses in multi-turn dialogs often produce irrelevant or non-useful responses to user input due in part to the criterion for the training and application stages being different and generated responses tend to be either generic, out-of-context, or disproportionately short. A multi-turn dialog may include multiple conversation turns with a user providing an utterance and a response to that utterance. For example, conventional dialogue generation models may be trained with teacher forcing methods where, during training, the generator generates the next word in the response by taking the past word from an actual human response (e.g. past input) rather than the past output of the generator. However, during the application stage, the generator may produce irrelevant responses to the user input because it is only able to use its own past input. This discrepancy between training and inference is known as exposure bias and significantly limits the informativeness of the responses as the decoding error compounds rapidly during inference. To address exposure bias, conventional systems typically use a scheduled sampling technique where the machine learning module is encouraged to use its own past output word as the basis to generate new responses. However, this may easily lead to instabilities. Additionally, conventional systems may also produce responses to user input that are limited in diversity because diversity is often not encouraged during the training stage but expected during the application stage. To address diversity, conventional systems may apply heuristic techniques to the output of a machine learning module. However, this typically does not provide the same quality and quantity of diversity as introducing diversity during the training stage. Additionally, some conventional systems address diversity by using maximum mutual information criteria; however, this still provides limited diversity in generated outputs.

Human conversations contain a large number of generic, uninformative responses, giving rise to word-level syntactic and utterance-level semantic redundancy. The syntactic redundancy is evident from a nonuniform sequence entropy profile that is concave with respect to token position, with the tokens at the beginning and end of a sequence having lower entropy than those in the middle. This initial positive energy gradient may create learning barriers leading to a poor calibration of the model's output distribution, and is a major contributing factor to the short, generic outputs in existing dialogue models. Earlier conversation models including single-turn sequence-to-sequence architectures typically fail to capture long-term temporal dependencies across conversation turns. Such models tend to fail in multi-turn scenarios, generating repetitive responses that are dull and generic. The use of multi-turn sequence-to-sequence models, such as the hierarchical recurrent encoder decoder architecture, tried to address this problem. The recurrent architecture, however, due to the gradient vanishing problem with backpropagation through time, limits the maximum number of turns and the number of word tokens in each turn that are used during training. One the major and often overlooked limitations of existing dialogue models is the limitations of the input/output representation. The data preprocessing used in existing dialogue models includes word-level tokenization and lowercasing with less frequent (usually more informative) words mapped to an out-of-vocabulary token and thus restrict the space of the input and output texts that may be modeled. This is especially problematic for closed-domain datasets with lots of technical jargon, where preprocessing yields a large number of out-of-vocabulary tokens in both training and inference. Unfortunately, using character-level representations with complete coverage requires gradient backpropagation through a very long sequence, which is impractical for existing recurrent architectures. Existing dialogue models typically learn the conditional distribution of the response given the context (either single- or multi-turn), from the maximum likelihood estimation. Due to the redundant nature of dialogue data and the greedy nature of maximum likelihood estimation, the model usually learns just a simple mapping between the context and response, which yields generic responses. Alternative training frameworks that complement maximum likelihood estimation with other constraints, such as generative adversarial networks, reinforcement learning, and variational auto-encoders, focus on modifying the conditional response distribution to encourage diversity.

Machine classifiers in accordance with embodiments of the invention capture long-term temporal dependencies in the dialogue data better than the existing RNN-based architectures. Additionally, machine classifiers may model the joint distribution of the context and response as opposed to the conditional distribution of the response given the context as employed in sequence-to-sequence frameworks. Machine classifiers in accordance with embodiments further append random paddings before and/or after the input data to reduce the syntactic redundancy in the input data, thereby improving the performance of the machine classifiers for a variety of dialogue-related tasks. The random padding of the input data may further provide regularization during the training of the machine classifier and/or reduce exposure bias. In a variety of embodiments, the input data may be encoded based on subword tokenization. Accordingly, transformer-based machine classifiers may be trained to more accurately identify and generate relevant and interesting responses, saving processing time, processing resources, and improving the ability of a computing device to classify data.

Machine classifiers may also be used to help users to perform a task such as making a hotel, restaurant, or flight reservation. When a user utterance is received, natural language processing techniques may be used to understand the user's intent. Additionally, other information provided by the user may be used to understand the user's intent.

Additionally, target slots may be identified in the user's utterances, where the target slots identify concepts provided by the user. The corresponding entities may be determined for the target slots based on the user's utterances. For example, if the user is trying to make a restaurant reservation, target slots may include a restaurant name, a reservation date, and a reservation time. The corresponding entities may include the name of the restaurant, the user's desired reservation date, and the time the user wishes to eat dinner. Templates may be determined based on the user's intent to aid in the identification of target slots and to guide the generation of responses to the user's utterances to solicit information from the user. For example, if the user's intent is determined to be booking an airline reservation, a template may be used to determine that the user's home address is a needed piece of information in order to determine which airport the user should depart from. If the user has not provided their address information, a generated response may include requesting the user provide their address information so a recommended airport may be provided.

A variety of persona attributes may be determined for a user. In several embodiments, the persona attributes may be determined based on the user's utterances and/or provided as metadata included with the user's utterances. The persona attributes may identify a variety of characteristics of the user. Based on the user's persona and/or task, a response persona may be determined. For example, if a user is requesting medical advice, a response persona that phrases answers in a medical context may be determined. The response persona may be used to generate responses to the user's utterances such that the generated responses match a tone appropriate to the task. Additionally, the response persona may be used to generate templates to solicit additional information and/or generate responses appropriate to the task. Machine classifiers may model the persona attributes, the response persona, and/or the response templates in parallel with and/or in addition to generating a response to the utterance.

Operating Environments and Computing Devices

FIG. 1 shows an operating environment 100. The operating environment 100 may include at least one client device 110, at least one task server system 130, and/or at least one classification server system 120 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may provide data and/or interact with a variety of machine classifiers as described herein. Classification server systems 120 may store, train, and/or provide a variety of machine classifiers as described herein. Task server systems 130 may exchange data with client devices 110, provide training data to the classification server systems 120, provide input data to the classification server systems 120 for classification, and/or obtain classified data from the classification server systems 120 as described herein. However, it should be noted that any computing device in the operating environment 100 may perform any of the processes and/or store any data as described herein. The task server systems 130 and/or classification server systems 120 may be publicly accessible and/or have restricted access. Access to a particular server system may be limited to particular client devices 110. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
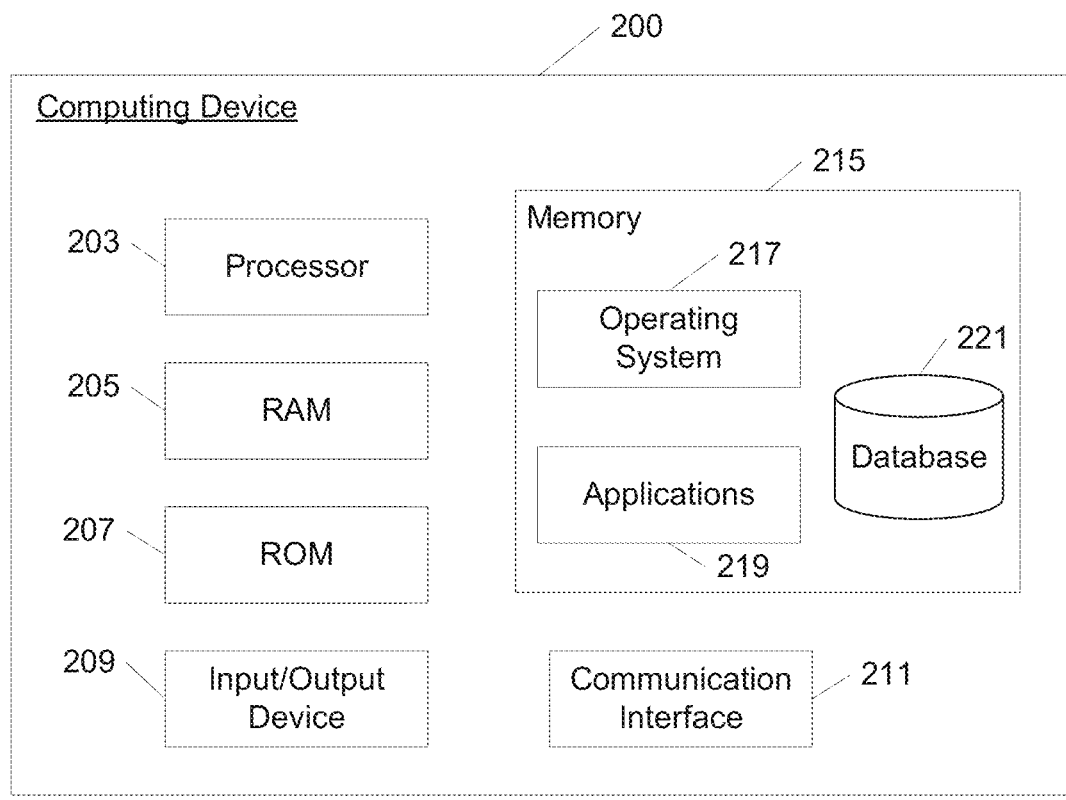
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Any data described and/or transmitted herein may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 200 in front of one or more computing devices such that any external devices may communicate directly with the specialized hardware.

Machine Classifiers and Processes

Figure 3:
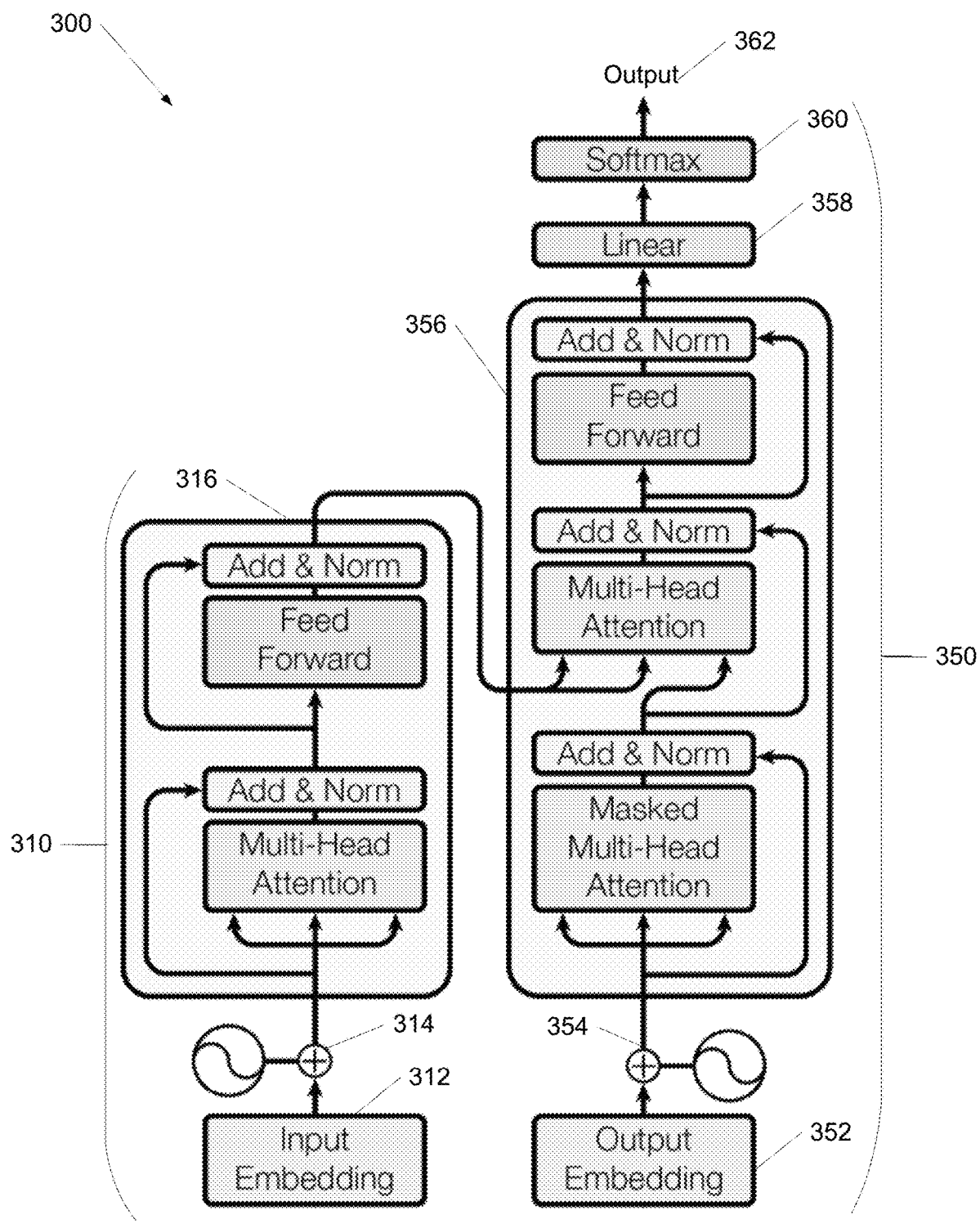
FIG. 3 shows an example of a machine classifier having a transformer architecture in accordance with one or more aspects described herein.

FIG. 3 shows an example of a machine classifier having a transformer architecture in accordance with one or more aspects described herein. The machine classifier 300 includes an encoder 310 and a decoder 350. In a variety of embodiments, the machine classifier 300 may use a sequence-to-sequence architecture that transforms a given input sequence, such as a sentence in a natural language processing task, into an output sequence. In several embodiments, the encoder and/or decoder use a long-short-term memory architecture, which may process the input sequence and/or output sequence while remembering (or forgetting) portions of the sequences that are important and/or unimportant. For example, sentences are typically sequence-dependent since the order of the words is crucial for understanding the meaning of the sentence. However, it should be noted that any machine classifier architectures may be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs may further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers may be utilized, more specific machine classifiers when available, and general machine classifiers at other times may further increase the accuracy of predictions.

The encoder 310 may take an input sequence 312 and generate an encoded input 314. The encoded input 314 may be a byte-pair encoding as described in more detail with respect to FIG. 5. The byte-pair encoding may include embedding a sequence into an n-dimensional space. The encoded input 314 may then be provided to an input attention layer 316 that processes the encoded input and provides the processed input data to the decoder 350. The decoder 350 may use an encoded output 354, generated based on a decoder input sequence 352, which is fed into an output attention layer 356 that generates one or more elements of an output sequence 362. In several embodiments, the encoding of the output sequence may include shifting the decoder input sequence one position. The generated elements may be processed, such as using a linear transformer 358 and/or SoftMax function 360 to add metadata, such as a confidence metric, to the generated elements of the output sequence 362. In a variety of embodiments, the decoder 350 generates the output sequence 362 on an element-by-element basis such that the input sequence 312 and decoder input sequence 352 are iteratively processed one element at a time.

An attention layer, such as input attention layer 316 and output attention layer 356, may analyze a sequence and determine one or more elements within the sequence that are important (or unimportant) to understanding the sequence. Analyzing the importance of a sequence may include determining the important elements previously seen in the sequence to provide context to the sequence. For example, when processing a sentence, an attention layer may identify elements within the sequence that provide grammatical semantics to understanding one or more concepts described by the sentence. In several embodiments, the attention layer may indicate the importance of an element by assigning a weight to a particular class of element based on its purpose within the sequence. Any weighting scheme, such as assigning a value between zero and one, or negative one and one, may be used as appropriate. The weighted elements provided by the attention layer may be provided to the decoder to assist the decoder in determining the output sequence based on the identified important elements within the input sequence. Similarly, unimportant elements may be ignored by the decoder so that the decoder avoids generating irrelevant or incorrect output based on the unimportant elements. In several embodiments, the encoder 310 and/or decoder 350 may contain multiple attention layers, 316 and 356 respectively. The attention layers may also include a feed-forward layer, such as a pointwise feed-forward layer. The feed-forward layer may include a feed-forward network with parameters for each position in a sequence. The parameters may be used to define a linear transformation of each element for the given sequence. In several embodiments, the parameters are the same for each element in the sequence.

The encoded sequences may include a variety of vector representations of the sequence being encoded. For example, an encoded sequence may include a vector representation of an element in the sequence, a vector representation of all the categories of elements in the sequence, and a vector representation of all the elements in the sequence. An attention mechanism may take vector representations of sequences and apply the appropriate attention weights to the vector representation of the elements based on the vector representation of the categories associated with the elements in the sequence. The attention mechanism may consider the encoder sequence and/or the decoder sequence as appropriate. In several embodiments, the attention weights are defined by how each element of the sequence, represented by the vector representation of the element in the sequence, is influenced by all the other elements in the sequence, represented by the vector representation of all the elements in the sequence. In several embodiments, a function, such as the SoftMax function, may be applied to the attention weights to distribute the attention weights between zero and one. Attention layers may include a variety of attention mechanisms, such as a scaled dot product attention mechanism and/or a multi-headed attention mechanism. Scaled dot product attention mechanisms may operate on a single element in a sequence at a time, while a multi-headed attention mechanism may operate on multiple elements in a sequence in parallel. Multi-headed attention mechanisms may also operate on different linear projections of the vector representations in parallel. A linear projection of a vector representation may be determined by multiplying the vector representation by a weight matrix learned during the training of the machine classifier. The weight matrices may be different depending on if the attention mechanism is being used by the encoder, the decoder, or both. An attention mechanism that connects the encoder and decoder may allow the encoder input sequence to be considered together with the current representation of the decoder input sequence during the generation of the output sequence.

Figure 4:
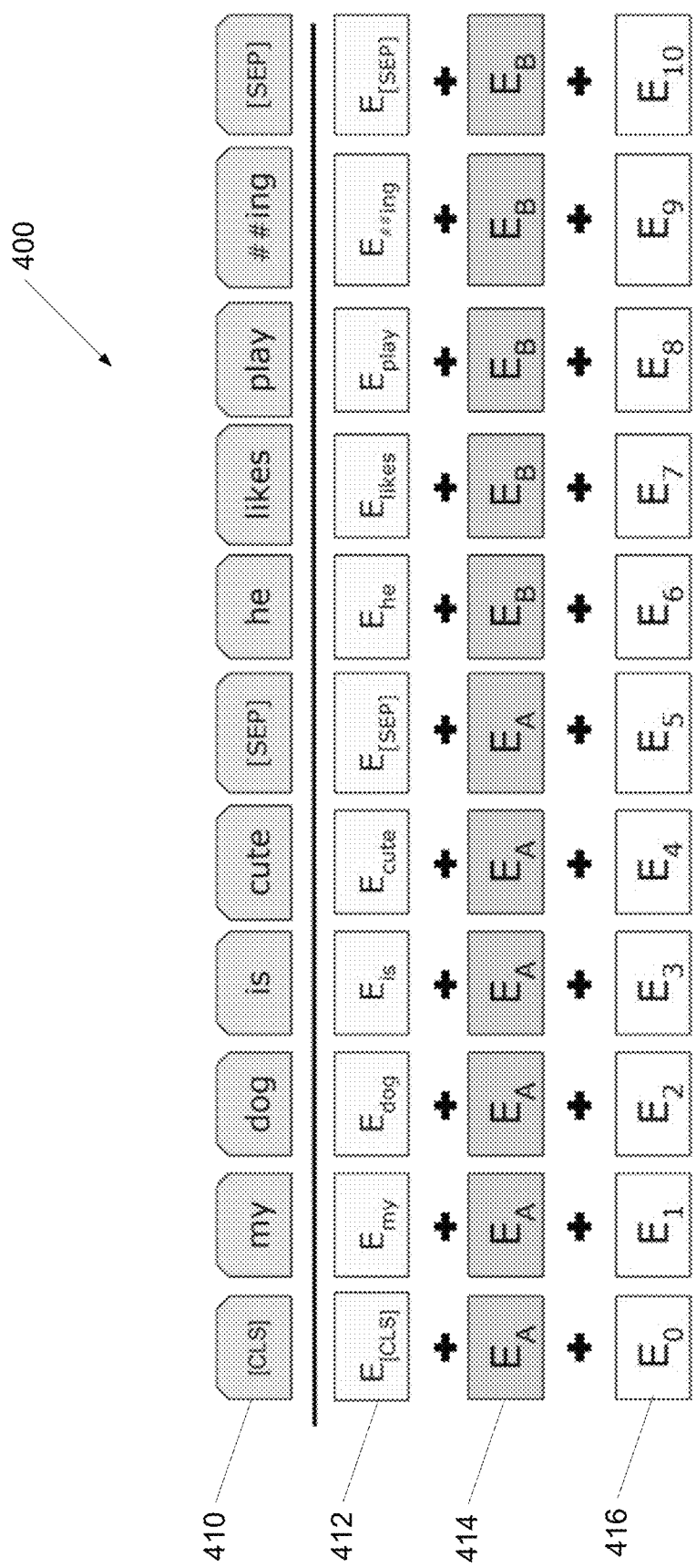
FIG. 4 shows an example of an encoding of input data in accordance with one or more aspects described herein.

FIG. 4 shows an example of encoding of input data in accordance with one or more aspects described herein. Encoded input data may include replacing multiple bytes of data with a byte that does not occur within the data. Any of a variety of encodings such as, but not limited to, byte pair encoding, WordPiece encoding, and subword tokenization may be used. Byte pair encoding is a form of data compression in which the most common set of consecutive bytes of data is replaced with a byte that does not occur within that data. A table of the replacement bytes is simultaneously generated such that the table may be used to reconstruct the original data from the compressed data by replacing the replacement bytes with the original bytes in reverse order of the original replacement. WordPiece encoding is a form of data compression in which commonly occurring subword pieces in a particular language are replaced with bytes not occurring within the language. The subword pieces may be determined based on the language and/or the words occurring within the data. The data may also be tokenized into subwords during the compression process. To perform subword tokenization, elements within the data may be broken into frequently occurring subwords. These subwords may then be substituted during the encoding of the data.

The encoded input data 400 includes an input sequence 410, token embeddings 412, segment embeddings 414, and position embeddings 416. In many embodiments, the encoding of the data is the sum of token embeddings 412, the segmentation embeddings 414, and the position embeddings 416. The input sequence 410 may include one or more tokens forming one or more subsequences within the input sequence 410. Each subsequence within the input sequence 410 may be related. For example, a first subsequence may be a statement and the second subsequence may be a response to that statement. The input sequence may begin with a start of sequence token, such as a [CLS] token as shown in encoded input data 400. The input sequence 410 may include multiple subsequences, such as multiple sentences in a dialog model, each subsequence being ended by a separator character. For example, a [SEP] token may be used to indicate the end of a subsequence in the input sequence 410. In several embodiments, a separator token not followed by another token may indicate the end of the input sequence 410. The tokens in the input sequence 410 may be stemmed, such as tokens "play" and "##ing" indicating that the input sequence 410 includes the word "playing" as shown in input sequence 410.

The token embeddings 412 may include an embedding for each token, including any separator tokens such as the start of sequence and separator tokens described herein, in the input sequence 410. The segmentation embeddings 414 may include an indication of, for each token in the input sequence 410, the subsequence in input sequence 410 to which the token belongs. For example, input sequence 410 includes two subsequences: subsequence A ("[CLS] my dog is cute [SEP]") and subsequence B ("he likes play ##ing [SEP]"). In segmentation embedding, those tokens associated with subsequence A are indicated by $E_A$ and those tokens associated with subsequence B are indicated by $E_B$. Position embeddings 416 may indicate the order in which each token appears in the input sequence 410. For example, input sequence 410 includes 11 tokens numbered $E_0$ to $E_{11}$.

A training example, such as an example for a multi-turn dialog, may include a sequence of N utterances $$x=(x_1, x_2, \ldots, x_N)$$

with utterance having a variable length $M_i$ word tokens $$x_i(x_i^1, x_i^2, \ldots, x_i^{M_i})$$

such that, for vocabulary V, $$x_i^j \in V$$

And at any time step i, the dialogue history may be expressed as $$x_i=(x_1, x_2, \ldots, x_i)$$

A dialogue response generate task may include, for a dialog history $x_i$, a response $$y_i=(y_i^1, y_i^2, \ldots, y_i^{T_i})$$

may be generated, where $T_i$ is the number of generated tokens such that the distribution of the generated response $P(y_i)$ is substantially equivalent to (e.g. indistinguishable from) the ground truth $P(x_{i+i})$ and $T_i=M_{i+1}$. The distribution of the model output sequence may be factored by the product rule:

$$P(y_i \mid x_i) = \prod_{j=2}^{T_i} P\left(y_i^j \mid y_i^{1:j-1}, x_i\right)$$

where $$y_i^{1:j-1} = \left(y_i^1, \ldots, y_i^{j-1}\right)$$

The maximum likelihood estimation objective based on the conditional distribution of the model output sequence may be expressed as $$L_{Cond} = -\log P_\theta(y_i \mid x_i) = -\sum_{j=2}^{T_i} \log P_\theta\left(y_i^j \mid y_i^{1:j-1}, x_i\right)$$

where θ is the model parameters.

In order to address semantic redundancy, the context and response may be modeled jointly as an alternative to the mutual information objective. The resulting distribution and the objective function may then be respectively expressed as:

$$P(y_i, x_i)=P(y_i|x_i)P(x_i)$$

$$L_{Joint}=-\log P_\theta(y_i|x_i)-\log P_\theta(x_i)$$

This addresses semantic redundancy in the input data. To address syntactic redundancy in the dialog data, random informative paddings may be added to encoder sequences used to train the encoder of the machine classifier. Informative paddings may include randomly selected paddings and/or paddings that add contextual information and/or metadata to the encoder sequence. In several embodiments, the informative paddings are sampled from the training data set. The informative paddings may be added before $x_i^b$ and/or after $x_i^a$ such that $$P(x_i^a, y_i, x_i, x_i^b)=P(x_i^a)P(y_i|x_i)P(x_i)P(x_i^b)$$

$$L_{DLGNet}=-\log P_\theta(x_i^a)-\log P_\theta(y_i|x_i)-\log P_\theta(x_i)-\log P_\theta(x_i^b)$$

$x_i^b$ and/or $x_i^a$ may be independent from $(y_i, x_i)$. Appending these random paddings may reduce adverse effects of syntactic redundancy in dialog data, resulting in the conditional distribution $P(y_i|x_i)$ being an inference on the joint distribution $P(x_i^a, y_i, x_i, x_i^b)$.

Machine classifiers in accordance with aspects of the application may utilize an autoregressive transformer architecture using only a decoder without the need for a separate encoder. Autoregressive transformer models may use multiple layers of masked multi-head self-attention to map a sequence of input tokens to a sequence of output tokens (i.e., the input sequence token shifted one position to the right). During inference, at each step, the machine classifier may be autoregressive, consuming the previously generated token as additional input when generating the next. There are some basic conceptual differences between autoregressive architectures based on transformers and those based on recurrent neural networks (RNNs). For instance, while the output of an RNN layer depends on only the immediate previous output, a transformer layer output consists of attention over all previous outputs. Due to this lack of ordering in transformer architectures, the position representation is usually passed along with the input tokens into the model. A variety of parameters, attention layers, and/or hidden state sizes may be used in a particular machine classifier. For example, a machine classifier may use 117 million parameters, 12 attention layers, and a hidden state size of 767 for a particular set of training examples for a first task. In a second example, a machine classifier may use 345 million parameters, 24 attention layers, and a hidden state size of 1024 for a different set of training examples for a second task. The machine classifiers may be trained using an adaptive moment estimation stochastic gradient descent with an arbitrary learning rate, such as 0.001. A variety of batch sizes and iterations may be used as appropriate.

Figure 5:
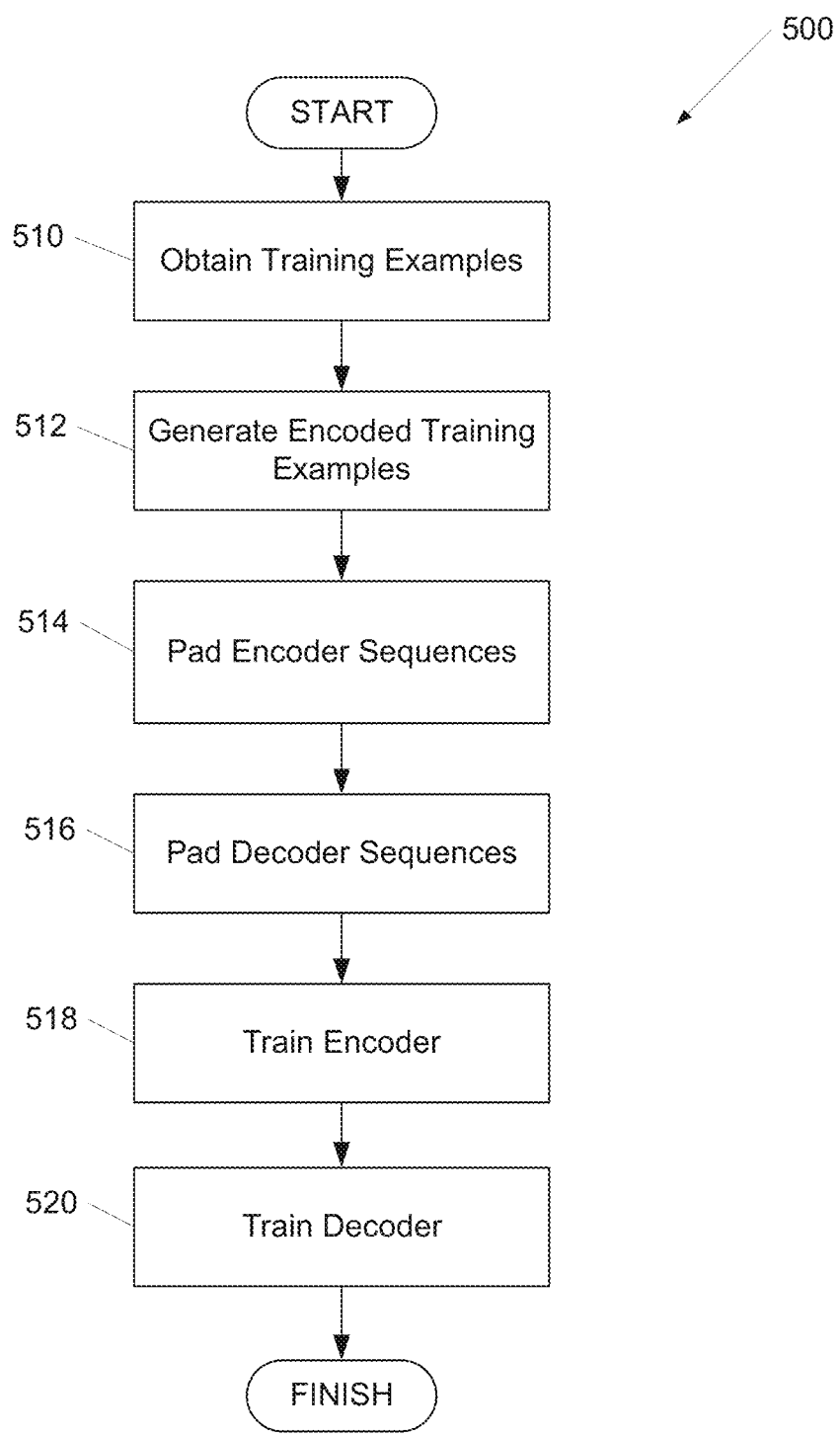
FIG. 5 shows a flow chart of a process for training a machine classifier according to one or more aspects of the disclosure.

FIG. 5 shows a flow chart of a process for training a machine classifier according to one or more aspects of the disclosure. Some or all of the steps of process 500 may be performed using one or more computing devices as described herein. In a variety of embodiments, some or all of the steps described below may be combined and/or divided into sub-steps as appropriate.

At step 510, training examples may be obtained. The training examples may include one or more input sequences. Each input sequence may be associated with a task. Each input sequence may include one or more subsequences. The subsequences may include encoder sequences and/or a decoder sequences that may be provided to an encoder and a decoder, respectively, of a machine classifier during a training process to train the machine classifier to classify data associated with the task. A machine classifier may be trained for the task represented by at least one input sequence in the training examples. An input sequence may include multiple subsequences as described herein. The input sequence may include a variety of user attributes. For example, for a dialog task, the input sequence may include user attributes regarding the tone of the user, the location of the user, the age of the user, the gender of the user, the class of task for which the machine classifier is being trained, and the like. A class of a task can indicate a particular topic or function that the task is trying to achieve, such as booking a hotel room, providing medical advice, or any other class of task as appropriate.

At step 512, encoded training examples may be generated. Any of a variety of encodings, such as byte pair encodings, WordPiece encodings, subword tokenization, and any other encoding may be utilized as appropriate. Encodings may be generated for each input sequence within the training examples. The encodings may include a token embedding, a segmentation embedding, and a position embedding as described herein. An encoding of a training example may include an indication of a task associated with the input sequence used to generate the encoded training examples. In a variety of embodiments, a subset of the training examples are encoded. The subset of training examples can be randomly sampled from the training examples and/or selected based on particular characteristics of the training examples. For example, if the machine classifier is being trained to identify a particular feature in input data, the training examples having that particular feature may be included in the subset of training examples.

At step 514, the encoder sequences may be padded. The encoder sequences may be padded using any tokens, such as a random sampling of encoded tokens from the training examples. The tokens may be prepended, appended, and/or randomly inserted within the encoder sequences as appropriate. This may address syntactic redundancy in the training examples and improve the training of the machine classifier when learning human conversation tasks.

At step 516, decoder sequences may be padded. A decoder sequence may be a subsequence within an input sequence that is provided to the decoder portion of a machine learning classifier. An input sequence may include one or more subsequences that are associated with an output to an input subsequence. For example, an input sequence may include a first subsequence that indicates a question and a second subsequence that is a response to the first subsequence. In another example, the input sequence may include a third subsequence that is a response to the second subsequence. In this way, a particular subsequence may be an output subsequence and/or an input subsequence based on the context in which the subsequence is being analyzed. Similarly, the second subsequence may be provided to a decoder as a decoder sequence when the encoder is being trained using the first subsequence, while the second subsequence may be provided to the encoder as an encoder subsequence when the decoder is being trained using the third subsequence as a decoder sequence. Decoder sequences may be padded to shift the tokens in the decoder sequence one or more positions to the right of the corresponding tokens in the corresponding input sequence. Decoder sequences may be shifted to reduce the likelihood that the machine classifier will learn to copy a decoder sequence for a particular input sequence during training of the machine classifier. By padding the decoder sequence for a particular input subsequence (e.g. an encoder sequence that is provided to an encoder of a machine classifier during training), the decoder may learn to generate an output token for a particular input token provided to the encoder. The decoder may learn to predict the target word/character for position i having only seen the word/characters 1, . . . , i−1 in the decoder sequence. In several embodiments, the decoder sequence is padded using a start of sentence token. In a number of embodiments, an end-of-sentence token is appended to the decoder input sequence to mark the end of that sequence.

At step 518, an encoder may be trained. The encoder may be trained for a particular task by providing one or more encoder sequences to the encoder. In several embodiments, an encoder sequence is associated with a loss mask and the encoder ignores encoder sequences that have been masked for the particular task. Training the encoder may include determining a set of attention weights for the tokens within the encoder sequence and providing the encoder sequence and/or attention weights to a decoder. The decoder may be simultaneously trained to decode the input sequence. In a variety of embodiments, training the encoder includes determining a persona based on the encoder sequence. The persona may include one or more of a variety of attributes such as speaker's identity, speaker's background, speaker's location, speaker's preference and so on, and target/output attributes, such as responder's identity, responder's background, responder's location, responder's preference, and the like. The speaker and responder can be based on the class of task. For example, if the user is trying to book a plane ticket, the speaker can be the passenger and the responder can be the agent assisting the passenger. In a second example, if the user is trying to obtain medical advice, the speaker can be the patient and the responder can be the doctor diagnosing the patient. A persona may also include a variety of contexts regarding the conversation and/or the conversation history. For example, a task context (e.g. a medical information request), a social context (e.g. formal meeting vs. party), and/or a temporal context (e.g. good morning vs. good evening) could be used to condition the generated response to the context in which the conversation is being conducted. In many embodiments, training the encoder includes selecting a template for generating a response. The selected template may include a template appropriate to the class of task and/or persona. The template may include template response language and/or one or more target slots. The target slots may be replaced by responses generated by the machine classifier as described in more detail herein. In a number of embodiments, training the encoder includes calculating a confidence metric indicating that the selected template corresponds to an appropriate template for the class of task and/or persona. The attributes used to determine the persona for a particular task can be determined based on the class of task. For example, some classes of tasks may use a persona based on location, while other classes may use a persona based on age and speaker's preferences. However, any combination of attributes can be used for a persona as appropriate.

At step 520, a decoder may be trained. The decoder may be trained by determining a set of attention weights for a decoder sequence corresponding to the encoder sequence provided to the encoder during the training of the encoder.

The attention weights for the decoder sequence may be determined based on the encoder sequence, the decoder sequence, and/or the encoder attention weights as appropriate. In several embodiments, the decoder is provided with the correct decoder data using a teacher forcing process. In many embodiments, the decoder sequence is associated with a loss mask and the decoder ignores decoder sequences that have been masked for the particular task. The training of the encoder and decoder may continue for each input sequence in the training examples. In a variety of embodiments, training the decoder includes determining a persona based on the decoder sequence. The determined persona may be appropriate for the identified class of task and/or response as appropriate. The machine classifier may determine the persona based on the utterances, the conversation history, and/or any other data as appropriate. In several embodiments, the persona is determined based on a ground truth persona identified in the training data. The persona may include a variety of attributes as described herein. In many embodiments, training the decoder includes selecting a template for generating a response. The selected template may include a template appropriate to the class of task and/or persona. In a number of embodiments, training the decoder includes calculating a confidence metric indicating that a template selected by the encoder corresponds to an appropriate template for the class of task and/or persona.

Although process 500 is described with respect to the joint training of the encoder and the decoder, it should be noted that a variety of embodiments of the invention separately train the encoder and the decoder. For example, many embodiments of the invention include only training the encoder using one or more encoded input sequences. A number of embodiments of the invention may include only training the decoder using one or more encoded decoder sequences. The decoder sequences may or may not be padded, particularly in those embodiments where only the decoder is being trained. In several embodiments, particularly those where the encoder and decoder are not being jointly trained, the encoder sequence may not be fed from the encoder to the decoder during the training process. That is, the decoder may be trained using a decoder sequence without a corresponding encoder sequence.

Figure 6:
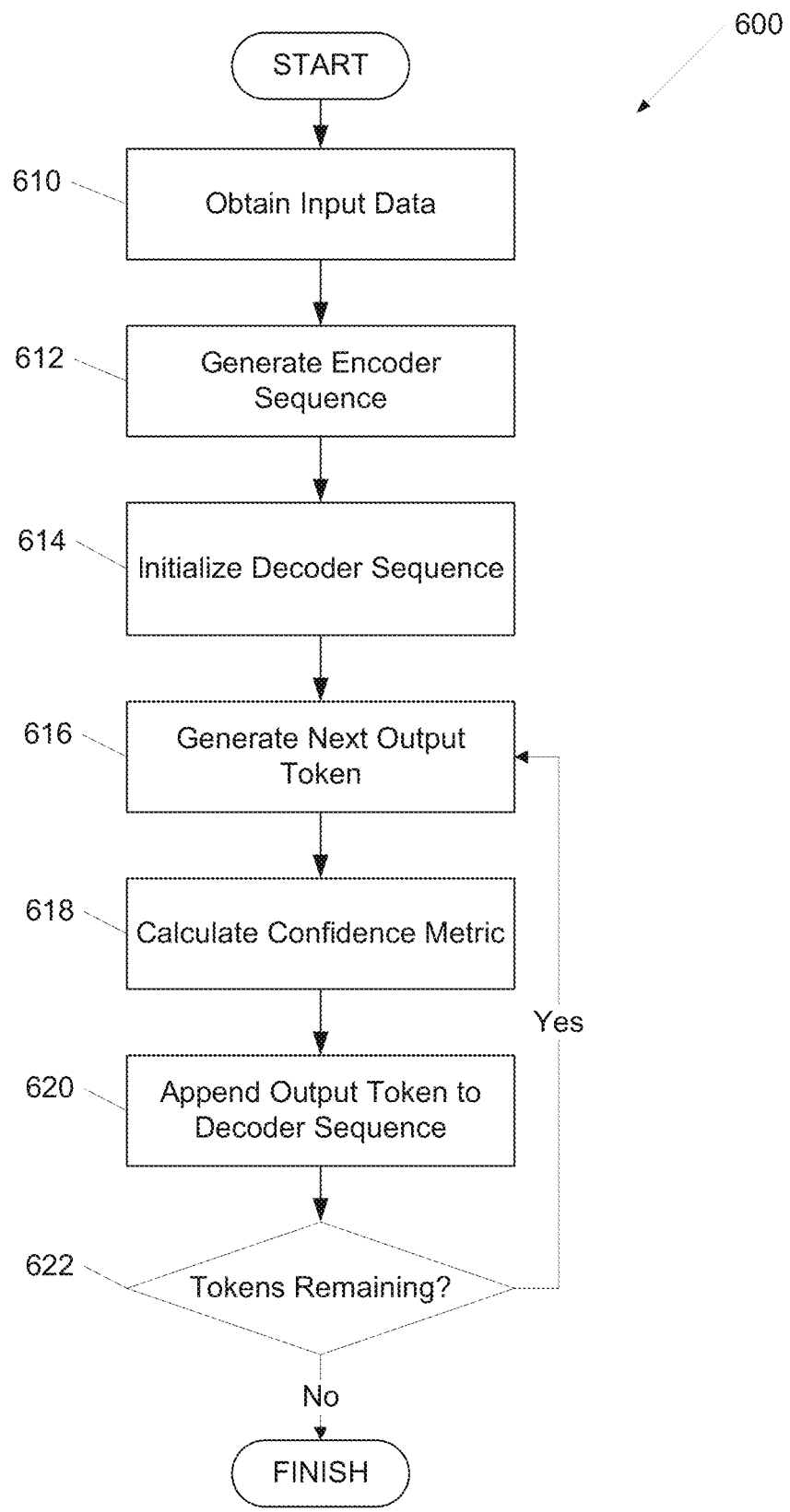
FIG. 6 shows a flow chart of a process for generating an output sequence according to one or more aspects of the disclosure.

FIG. 6 shows a flow chart of a process for generating an output sequence according to one or more aspects of the disclosure. Some or all of the steps of process 600 may be performed using one or more computing devices as described herein. In a variety of embodiments, some or all of the steps described below may be combined and/or divided into sub-steps as appropriate.

At step 610, input data may be obtained. The input data may include an input sequence for which a desired output is to be generated. The input data may include one or more subsequences and each subsequence may include one or more tokens as described herein.

At step 612, an encoder sequence may be generated. The encoder sequence may be generated by encoding the input data. The input data may be encoded into an encoder sequence using any of a variety of encodings as described herein. The encoding may include a token embedding, a segmentation embedding, and a position embedding as described herein.

At step 614, a decoder sequence may be initialized. The initial decoder sequence may include a start of sequence token. In several embodiments, the initial decoder sequence only includes a start of sequence token. However, the initial decoder sequence may include a variety of tokens as appropriate.

At step 616, a next output token may be generated. The next output token may be generated by providing the encoder sequence to the encoder of the machine classifier and the decoder sequence to the decoder of the machine classifier. The decoder may generate the next token for the output sequence based on the encoder sequence, the attention weights for the encoder sequence provided by the encoder, and the tokens currently present in the output sequence.

At step 618, a confidence metric may be calculated. The confidence metric may be calculated based on the likelihood that the decoder has generated a correct token based on the encoder sequence and/or the decoder sequence currently generated. The likelihood of correctness may be based on the training of the encoder and/or decoder as described herein. In a variety of embodiments, the attention weights associated with the encoder sequence and/or decoder sequence may be used to calculate the confidence metric.

At step 620, the next output token and associated confidence metric may be included in the decoder sequence. In many embodiments, the next output token is appended to the decoder sequence. However, the next output token may be placed anywhere in the decoder sequence as appropriate.

At step 622, the number of remaining tokens in the encoder sequence may be determined. When additional tokens are present in the encoder sequence, process 600 may return to step 616 for processing the next token present in the encoder sequence. When no more tokens remain in the encoder sequence, process 600 may finish. In several embodiments, the end of the encoder sequence may be indicated by an end of sequence token. In a variety of embodiments, when no more tokens are present in the encoder sequence, an end of sequence token is appended to the decoder sequence. The decoder sequence may be provided to a variety of systems as the output of the classification of the input data.

Despite the drastic improvement of natural language processing with the recent advances in machine learning, scaling task-oriented dialogue systems is still a challenging task. Machine classifiers in accordance with aspects of the disclosure are capable of allowing end-to-end task-oriented dialogue systems to complete user tasks in multi-turn multi-domain conversations using both a modularized and/or an end-to-end communication system. Machine classifiers may learn the joint distribution of the inputs and outputs of the functional blocks of existing modular approaches such as, natural language understanding (NLU), state tracking, action policy, as well as natural language generation (NLG). Rather than training individual machine classifiers for each task, the machine classifiers may be jointly trained on the tasks with appropriate module separations. This allows a traditional black-box end-to-end model to be controllable, verifiable, and explainable at the inputs and outputs of each module during deployment. Machine classifiers employed in practical conversational AI systems reduces the level of effort required for developing, deploying, and maintaining large scale intelligent assistants.

Machine classifiers may model the individual behavior of natural language understanding (NLU), dialog management (DM), and natural language generation (NLG) components with a single machine classifier trained end-to-end. The machine classifier may be separately trained and validated with respect to the NLU, DM, and NLG components. Validation at component level may provide information about where additional training is needed and/or assist in balancing the contribution of each component based on component-level objectives.

Figure 7:
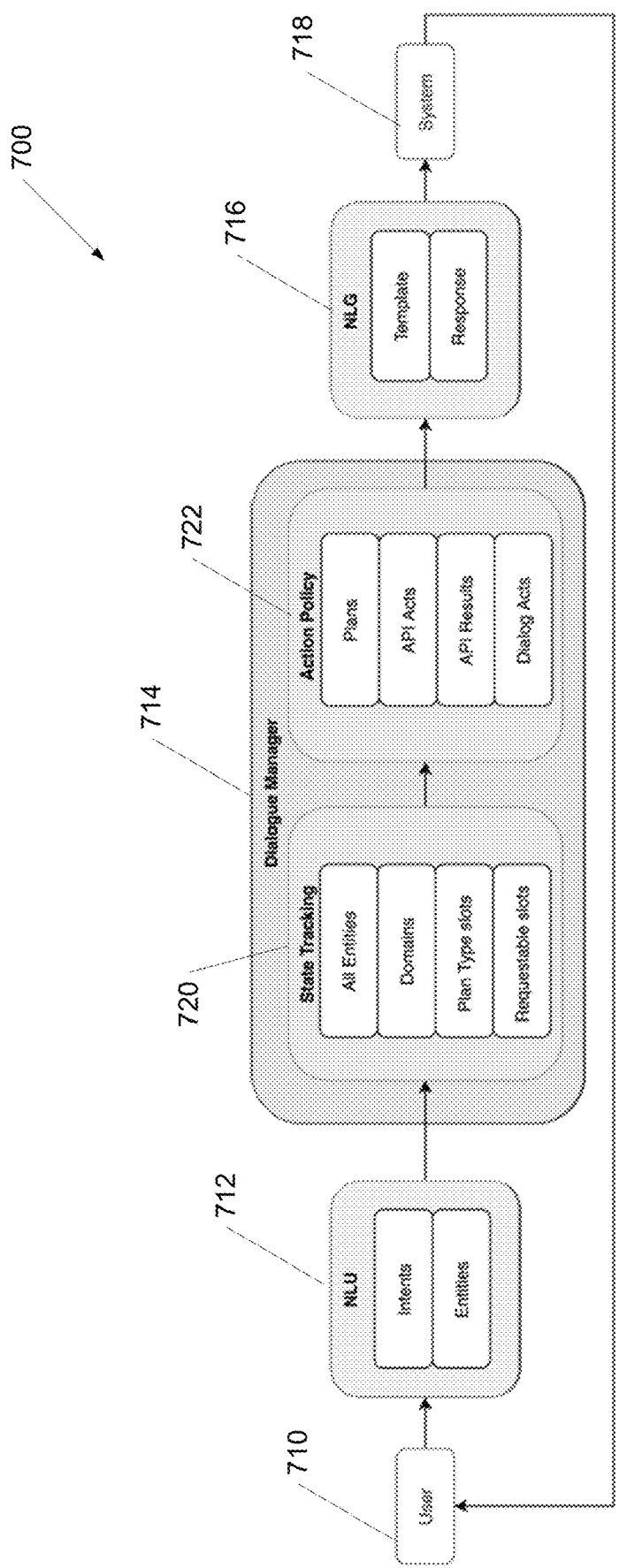
FIG. 7 shows an example of a framework for generating task responses and templates in accordance with one or more aspects described herein.

FIG. 7 shows an example of a framework for generating task responses and templates in accordance with one or more aspects described herein. A machine classifier may learn the joint distribution of the functional blocks illustrated in framework 700. In many embodiments, the framework 700 accumulates the dialogue state at each turn, unlike existing systems that accumulate the dialogue history. In addition to the joint modeling of open-domain and task-oriented dialogue, accumulating the dialog state at each turn state fits better with dialog system applications employing expert driven rule-based dialog modeling. A dialog turn may be modeled based on a user utterance U, intent I, entities E, all entities AE, domains D, target slots S, plans P, API actions AA, API results AR, dialog actions DA, template T, and response R.

User utterance U may include information, such as a dialog, provided by a user. The user utterance U may be used to identify an intent I of an action that the user wishes to take. For example, the user may intend to book an airline ticket. The user utterance U may also include one or more target slots S identifying a class of entity along with an indication of the entity E. All entity information AE may include any entities identified at a previous conversation turn and/or the currently identified entities. For example, at conversation turn t, $AE_t=AE_{t-1}+E_t$. Domain D may indicate a class of task that the user desires to undertake such as, but not limited to, booking a hotel, booking a train ticket, and booking a restaurant reservation. Target slots S may be classified as informable, requestable, and/or book slots. Informable slots represent user constraints. Requestable slots hold additional information that the user wants to obtain. Book slots are used to reserve a place recommended by the system. In order to generalize the slot types to new use cases, the slots may be mapped from a particular class of action to a function (e.g. a plan). That is, informable and book slots may be mapped to search and booking slots respectively, indicating what the slots are being used for. The requestable slots remain to hold additional information that the user wants to obtain. The target slots S may be predicted for the domain D. The machine classifier may be provided with a list of slots for each plan type along with an indication if each slot is filled or not. During inference, with a new domain or plan type, the machine classifier may fill the target slots S based on the utterance U and entity E information. Plans P indicate a particular class of response to be generated by the machine classifier. For example, plans may include a welcome plan to greet users, a goodbye plan to end the conversation, a require more plan to solicit additional information from the user, a search plan to locate data based on the slots and entities provided in a user utterance, and/or an action plan to cause an action to be performed by a system. For example, an action plan may include booking a reservation. API Actions AA may include a call provided to a remote system in order to obtain additional data and/or perform an action. An API Action may include a target address identifying a function and a set of arguments for that function. For example, an API Action may include a web service that causes a particular action to be performed based on the provided arguments. The results of the action may be provided as the API Results AR. Dialog Actions DA may include appropriate actions for the determined plan P. For example, dialog actions may include, but are not limited to, inform, request, recommend, select, book, offer booking, booking error, search error, and/or other error. It should be noted that the dialogue actions will vary based on the embodiment or task as appropriate. In several embodiments, a dialog action may use the format [PLAN-STATUSCODE-ACTION] for the domain with appropriate slot information. In several embodiments, performing an action includes obtaining a user utterance having a confirmation that the action should be performed. Template T may include a pre-defined format of a response generated for the user utterance U. Response R may include the response generated by the machine classifier. A variety of information in the response may be inserted into the template in order to generate the response as described herein.

The framework 700 includes an utterance, at time t, $U_t$ 710 and information from the previous dialog turn t−1 and $I_{t-1}$, $E_{t-1}$, $AE_{t-1}$, $D_{t-1}$, $S_{t-1}$, $P_{t-1}$, $AA_{t-1}$, $AR_{t-1}$, $DA_{t-1}$, $T_{t-1}$, and $R_{t-1}$. NLU module 712 may predict intent $I_t$ if applicable and/or predict entities $E_t$. Dialog manager module 714 may include a state tracking module 720 and an action policy module 722. The state tracking module 720 may obtain data from the NLU module 712 and may predict all entities $AE_t$, domains $D_t$, and/or target slots $S_t$. The action policy module 722 may obtain data from the state tracking module 720 and predict plans $P_t$, API actions $AA_t$, obtain API results $AR_t$, and/or predict dialog actions $DA_t$. $P_t$ may be used to predict $AA_t$, which may be used to obtain $AR_t$. $P_t$ may also be used to predict $DA_t$. The NLG module 716 may obtain data from the NLU module 712 and/or dialog manager module 714 and predict a template $T_t$ and/or generate a response $R_t$.

Figure 8:
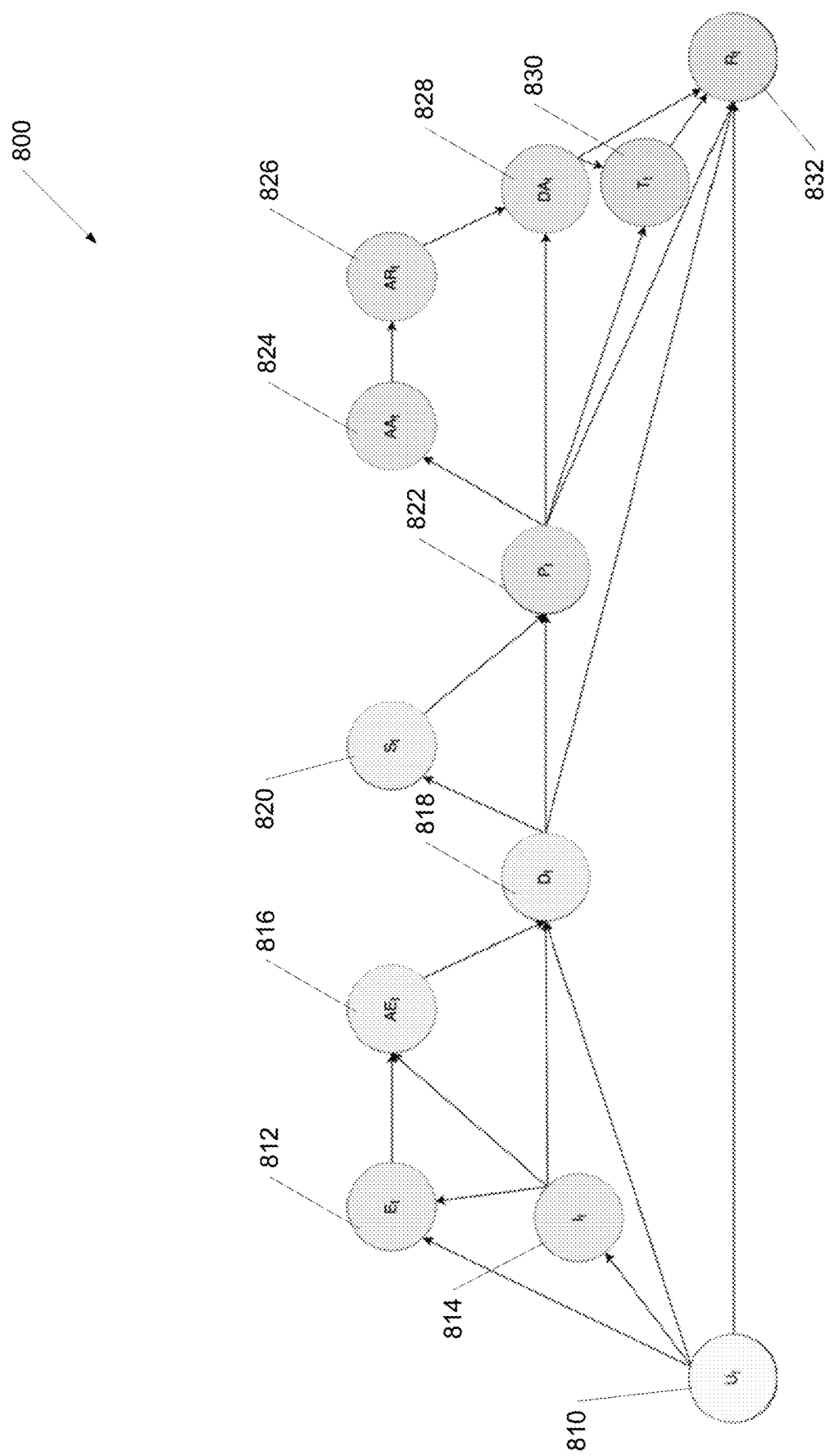
FIG. 8 shows a graph of an information flow between the functional blocks of a framework for generating task responses in accordance with one or more aspects described herein.

FIG. 8 shows a graph of an information flow between the functional blocks of a framework for generating task responses in accordance with one or more aspects described herein. For example, the direct connection between the utterance node 810 and the response node 832 may be used to learn open-domain use cases, while other traversals through the graph 800 may represent different instances of task-oriented dialog and grounded conversation systems. The utterance node 810 may share data with the entity node 812, intent node 814, domain node 818, and/or the response node 832. The entity node 812 may share data with the all entities node 816. The intent node 814 may share data with the entity node 812, all entities node 816, and domain node 818. The domain node 818 may share data with the target slots node 820, the plans node 822, and/or the response node 832. The target slots node 820 may share data with the plans node 822. The plans node 822 may share data with the API Actions node 824, the dialog actions node 828, the template node 830, and/or the response node 832. The API Actions node may share data with the API response node 826, which may share data with the dialog actions node 828. The dialog actions node may share data with the template node 830 and/or the response node 832, while the template node 830 may share data with the response node 832.

Machine classifier in accordance with embodiments of the invention may convert task data, such as a multi-turn dialog including one or more conversation turns, where a conversation turn includes at least one user utterance and one or more responses to the user utterances, into word tokens as described herein. A delimiter token may be inserted into each functional block in each conversation turn. The delimiter tokens may also include a turn separator for separating conversation turns within a conversation and conversation separator for separating conversations within the task data.

Machine classifiers may separate entity recognition from target slot filling (e.g. replacing a target slot with a response and/or entity) to improve compatibility with existing modularized pipeline architectures. By tracking all entities identified throughout the task, the machine classifier may verify and/or replace any previously identified and/or generated entity at any conversation turn. In a variety of embodiments, machine classifiers may generate both a template a response.

The machine classifier may delexicalize all the values of requestable slots (e.g. reference number, name, postcode, phone number, address) as [DOMAIN_SLOTNAME] (e.g. [airplane reference] for airline booking reference) that appear in the conversation history. Machine classifiers may directly generate the final response, as opposed to existing systems that typically use post-processing to string-replace the delexicalized token later by the information obtained from the API call.

The machine classifiers may be trained using an autoregressive language model for joint distribution modeling with random informative padding as described herein. In several embodiments, the training objective L may be defined for parameters $P_\theta$ as:

$$L_{DLGNet}(x_1, x_2, \ldots, x_n) = \sum_i \log P_\theta(x_i | x_1, \ldots, x_{i-1})$$

As machine classifiers may include a word-token sequence generation model, the traditional decoding approach is to explore sequence decoding strategies such as greedy decoding, beam-search decoding, top k sampling, and/or top p sampling strategies. However, task oriented dialog systems contain both natural language and several ontology-driven key-value pairs, such as graph node-value, intent-value, entity-value, slot-entity, domain-value, plan-value, plan-API action, plan-dialog action pairs. The ontology-driven key-value pairs provide opportunities for discrimination since some of the key and possible values may be known a priori from the system ontology. The ontology itself may be used during training and/or to ground value generation or selection during inference. For example, given the triples $$(C, K_i, \{V_i\}_j^J)$$

of context C, key K, and possible values V, a machine classifier may estimate the likelihood of each possible value $V_i^j$ and delimiter tokens DL as:

$$P_\theta(V_i^j | K_i, C) = DLGNet([C, DL_{key}, K_i, DL_{value}, V_i^j])$$

The likelihood scores may be used to rank possible values during inference, which also improves generalization to new key-value pairs. Using the likelihood score, a normalized conditional distribution over the value options may be estimated as:

$$P(V_i^j | K_i, C) = \frac{\exp\left(\frac{1}{T_i} \log P_\theta(V_i^j | K_i, C)\right)}{\sum_j^J \exp\left(\frac{1}{T_i} \log P_\theta(V_i^j | K_i, C)\right)}$$

where hyperparameter $T_i \in (0,1]$ is the decoding temperature.

Figure 9A:
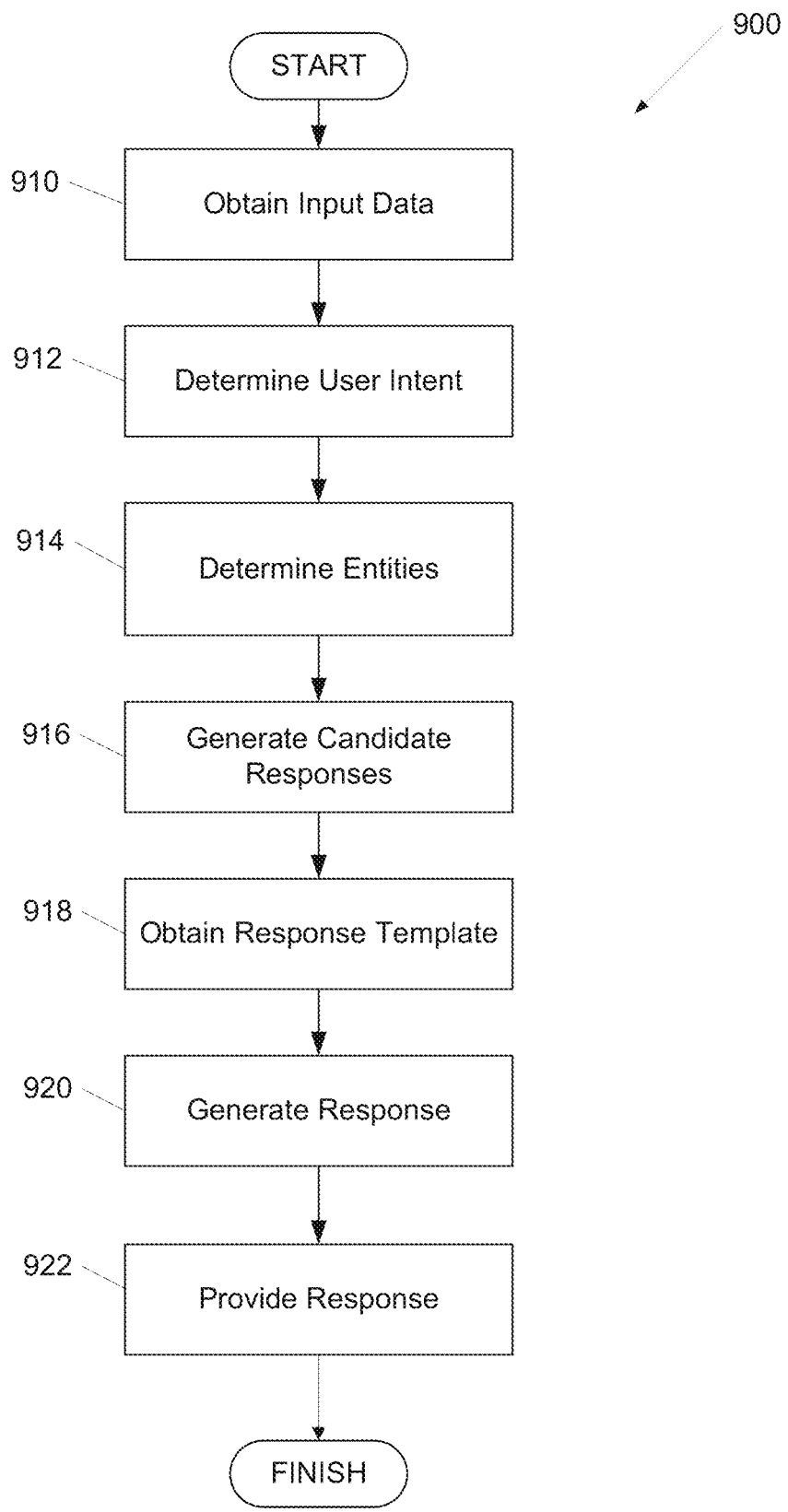
FIGS. 9A-B show flow charts of processes for generating responses according to one or more aspects of the disclosure.

FIG. 9A shows a flow chart of a process for generating responses according to one or more aspects of the disclosure. Some or all of the steps of process 900 may be performed using one or more computing devices as described herein. In a variety of embodiments, some or all of the steps described below may be combined and/or divided into sub-steps as appropriate.

At step 910, input data may be obtained. The input data may include an input sequence for which a desired output is to be generated. The input data may include one or more subsequences and each subsequence may include one or more tokens as described herein. The subsequences may correspond to a user utterance and/or a response to that utterance. In many embodiments, each subsequence is separated by a delimiter token.

At step 912, user intent may be determined. The user intent may be determined for the input data and/or for each subsequence as appropriate. The user intent may indicate a class of task that the user desires to complete. The user intent may be determined based on an entity provided by the user and/or by analyzing the input data using any of a variety of natural language processing techniques. Natural language processing techniques include, but are not limited to, lexical semantics, named entity recognition, grammar induction, lemmatization, morphological segmentation, part of speech tagging, terminal extraction, and automatic summarization.

At step 914, entities may be determined. The entities may be determined based on the user intent and the utterances provided by the user. The entities may include a value for a particular target slot identified in the subsequences. The target slots may be determined based on the class of task corresponding to the user's intent. For example, if the user is trying to book an airline ticket, target slots may include departure airport, destination airport, date and time of travel, number of passengers, the user's name, date of birth, priority travel information, and the like. The determined entities may be the values for the target slots as provided by the user. A variety of natural language processing techniques, such as named entity recognition, may be used to determine the entities as appropriate.

At step 916, candidate responses may be determined. Candidate responses may be generated using a machine classifier as described herein, particularly with respect to FIG. 6. The machine classifier may be trained end-to-end using an Adaptive Moment Estimation stochastic gradient descent algorithm with a learning rate of 0.0001 with a maximum sequence length of 1024. A batch size of 2 may be used and gradients may be accumulated over five iterations, giving an effective batch size of 10. The machine classifier may be trained until the training perplexity on the dialogue datasets reaches a steady state. However, it should be noted that any training algorithm, learning rate, sequence length, batch size, accumulation interval, and/or any other property may be used as appropriate. The candidate responses may be generated based on the user intent and/or entities. For example, if the user is booking an airline ticket, candidate responses may include responses requesting a destination airport, a travel time, a frequent flyer number, or confirming the flight details. Each candidate response may be associated with a confidence metric as described herein.

At step 918, a response template may be obtained. The response template may be obtained from a database of response templates for the class of task and/or generated by the machine classifier. In several embodiments, the response template is generated based on a persona of the user and/or response as described in more detail with respect to FIG. 10. The response template may indicate a response to the user utterance and/or be based on the user intent. In several embodiments, the response template is based on the determined entities and/or solicits additional entity information from the user in the next user utterance. For example, if the user is booking an airline ticket and has not provided a destination airport, the obtained response template may request that the user provide a destination airport.

At step 920, a response may be generated. The response may be generated based on the candidate responses and the response template. For example, if the generated template is targeted toward requesting a destination airport, the generated response may include a candidate response indicating a request for a destination airport formatted according to the response template. For example, a generated response may include "Thank you for booking your travel with us! What airport would you like to travel to?"

At step 922, a response may be provided. The response may be provided to a user via any of a variety of interfaces. For example, the response may be transmitted to a web browser running on a computing device for display on a web page. In several embodiments, the response may be provided as a notification and/or short messaging service (SMS) message for display on a mobile device. However, the response may be provided using any technique as appropriate.

Figure 9B:
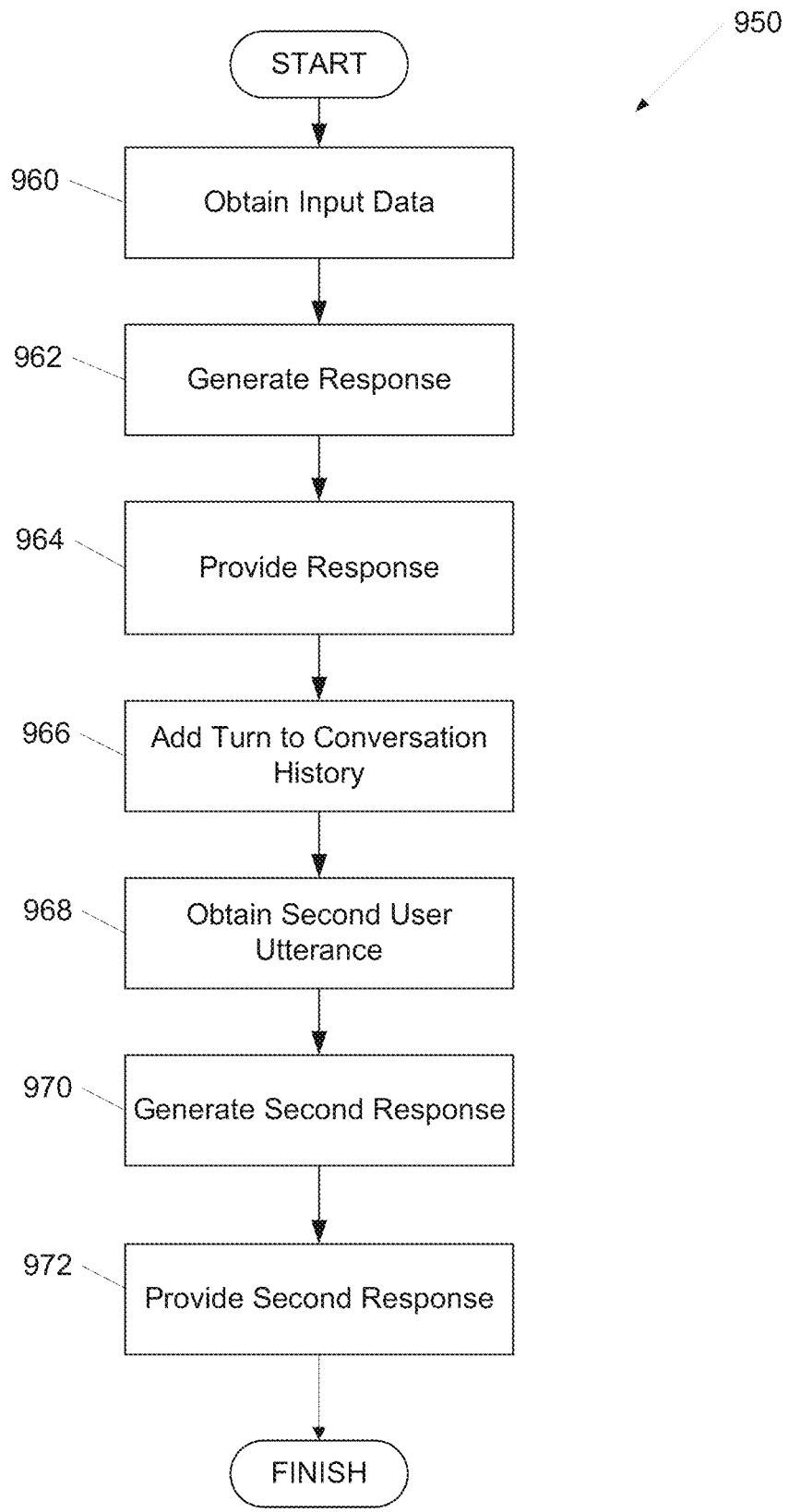

FIG. 9B shows a flow chart of a process for generating responses according to one or more aspects of the disclosure. Some or all of the steps of process 950 may be performed using one or more computing devices as described herein. In a variety of embodiments, some or all of the steps described below may be combined and/or divided into sub-steps as appropriate.

At step 960, input data may be received. The input data may include a user utterance and/or a conversation history as described herein. At step 962, a response may be generated. At step 964, a response may be provided. A variety of processes, including those described herein and particularly with respect to FIG. 9A, may be used to process input data and provide a response.

At step 966, a conversation history can be updated. The conversation history can be updated based on the user utterance received along with the generated response. In several embodiments, the conversation history includes one or more conversation turns in a multi-turn dialog. The user utterance and the provided response can be combined into a new conversation turn that can be added to the conversation history. Additionally, any other information generated during the generating of the response may be added to the conversation history as appropriate. For example, any entities identified in the user utterance can be added to an all entities database maintained as part of the conversation history as described herein. However, it should be noted that any of the data described herein may be used during the generation of the response and updated as appropriate.

At step 968, a second user utterance may be received. The second user utterance may be a response to the provided response. The second user utterance can identify a variety of entities and/or provide data responsive to the provided response as described herein. At step 970, a second response may be generated. At step 972, a second response may be provided. The second response may be responsive to the second user utterance. The second response may be generated based on the updated conversation history. A variety of processes, including those described herein and particularly with respect to FIG. 9A, may be used to process the second user utterance and provide the second response.

Figure 10:
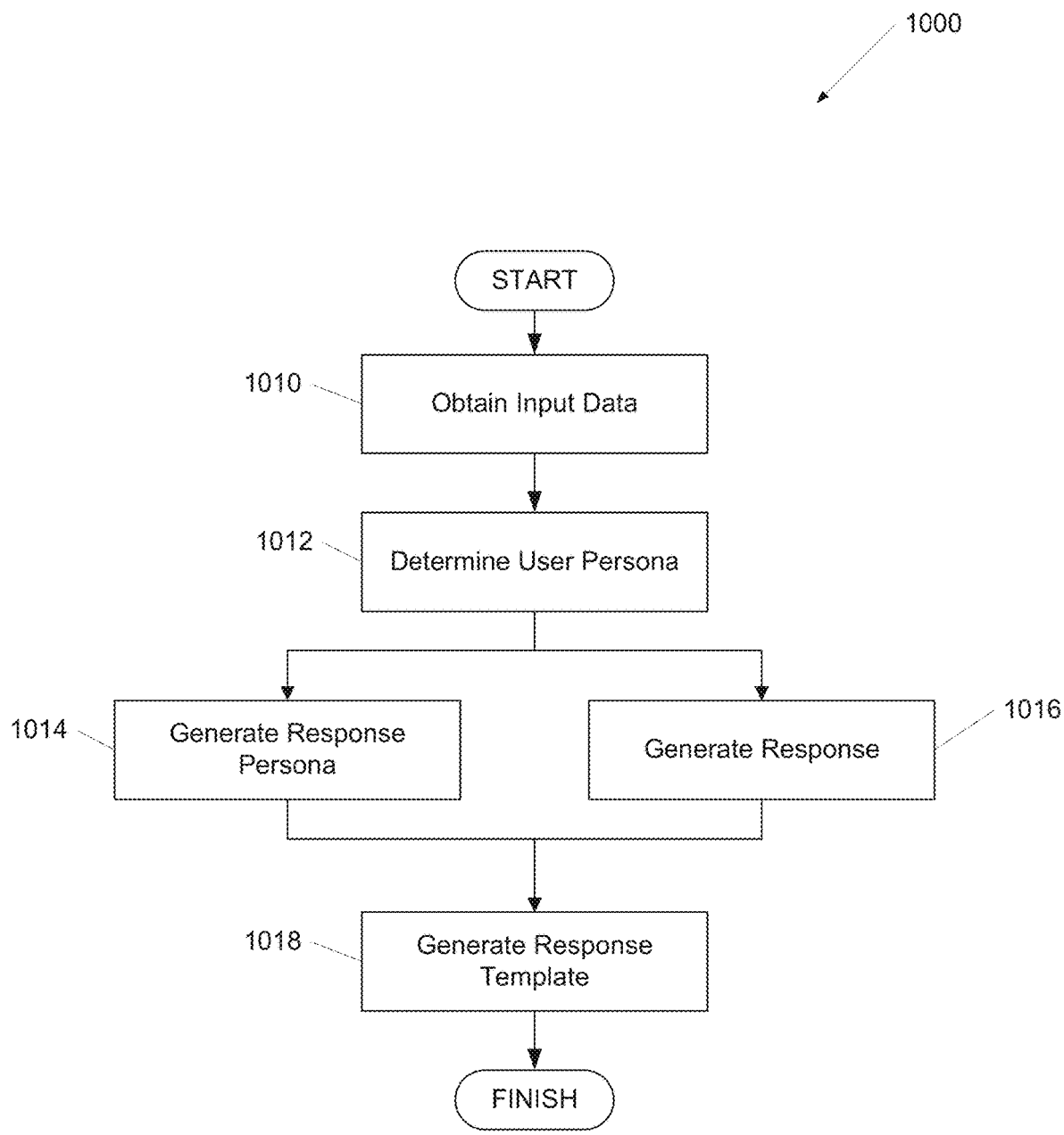
FIG. 10 shows a flow chart of a process for generating persona-based responses according to one or more aspects of the disclosure.

FIG. 10 shows a flow chart of a process for generating persona-based responses according to one or more aspects of the disclosure. Some or all of the steps of process 1000 may be performed using one or more computing devices as described herein. In a variety of embodiments, some or all of the steps described below may be combined and/or divided into sub-steps as appropriate.

At step 1010, input data may be obtained. The input data may include an input sequence for which a desired output is to be generated. The input data may include one or more subsequences and each subsequence may include one or more tokens as described herein. The subsequences may correspond to a user utterance and/or a response to that utterance. In many embodiments, each subsequence is separated by a delimiter token. The input data may also indicate a user intent and/or class of task the user desires to complete.

At step 1012, a user persona may be determined. The user persona may be determined based on the user utterances. In several embodiments, the user persona is determined based on metadata provided with the input data identifying characteristics of the user. The user persona may indicate a variety of attributes of the user such as, but not limited to, speaker's identity, speaker's background, speaker's location, and speaker's preference. The user persona may be determined using a variety of natural language understanding techniques as appropriate. In several embodiments, the user persona is generated using a machine classifier processing the input data. For example, a machine classifier may determine a user persona and/or a confidence metric in the generated user persona while generating a response to a user utterance as described herein.

At step 1014, a response persona may be generated. The response persona may be generated based on the class of task and/or the user persona as appropriate. The response persona may indicate a variety of attributes of the responder to the user's utterance, such as responder's identity, responder's background, responder's location, responder's preference. The response persona may be selected from a database of existing response personas for particular classes of tasks and/or user personas. In several embodiments, the response persona is generated using a machine classifier based on the user utterances and/or user persona as appropriate.

At step 1016, a response may be generated. The response may be responsive to the user utterance in the input data. In several embodiments, the response is generated using a machine classifier as described herein. In many embodiments, the generated response includes one or more keywords determined based on the response persona and/or the user persona. In this way, the generated response may match a tone and/or tenor appropriate to the task and/or user. For example, if the task is requesting medical information, the generated response may be phrased in formal medical terms. In a second example, for booking a restaurant reservation, a less formal response may be generated for a 21-year old user and a more formal response may be generated for a 72-year old user. The generated responses may be more appropriate for a specific user group. This inherently increases the response diversity since it is no longer an average response.

The response persona may be generated in parallel and/or in sequence with the response as appropriate. Injecting attributes into the response generation may allow the machine classifier to learn how to generate responses conditioned on particular attribute(s) across conversation turns. Since the attributes are discrete, it also may allow for exploring different what-if scenarios of generated responses. Multi-modal attributes such as speaker name/identity and dialogue subtopic may be available along with user utterances, and the generated response may be improved by conditioning the response generation on these attributes. During dialogue response generation, the model may generate responses consistent with the user persona or other utterance attributes within the input data. Moreover, conditioning on multiple attributes may allow the model to explore different what-if scenarios given a dialogue history. The machine classifier may produce the likelihood that the generated response comes from the correct attribute and may be either one vs. all or multi-label classification.

At step 1018, a response template may be generated. A response template may include a response having one or more target slots. The response template may be generated based on the response persona. In several embodiments, a variety of response templates may be generated for different user personas for a particular task. In this way, generated responses may be formatted to solicit information from users based on the attributes of the user. The generated response template may be reused in future tasks by the machine classifier to generate responses as described herein.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
    initializing a machine classifier having a sequence to sequence network architecture, wherein the sequence to sequence network architecture comprises an encoder and a decoder;
    obtaining input data comprising a conversation history and a user utterance;
    determining a user intent based on the user utterance;
    determining, based on the conversation history and the user utterance, at least one entity in the user utterance;
    generating, by the machine classifier and based on the user intent and the user utterance, a candidate response;
    obtaining, by the machine classifier and based on the user intent and the at least one entity, a response template;
    generating, by the machine classifier and based on the response template and the candidate response, a first response; and
    providing the first response.

2. The method of claim 1, further comprising training the machine classifier, based on a training set comprising a plurality of encoder sequences and corresponding decoder sequences, by:
    generating an encoding of each encoder sequence and corresponding decoder sequence of the plurality of encoder sequences and corresponding decoder sequences in the training set; and
    selecting a subset of the encodings and for each encoding of the subset of encodings:
        appending an informative padding to the encoding;
        prepending a start of sequence token to the encoding of the encoder sequence;
        appending an end of sequence token to the encoding of the corresponding decoder sequence;
        training the encoder using the encoding of the encoder sequence; and
        training the decoder using the encoding of the corresponding decoder sequence.

3. The computer-implemented method of claim 2, wherein each encoding comprises one or more tokens and an attention weight for each of the one or more tokens.

4. The computer-implemented method of claim 3, wherein the training the encoder using the encoding of the encoder sequence comprises updating the attention weight for at least one token, of the one or more tokens, in the encoding of the encoder sequence.

5. The computer-implemented method of claim 3, wherein the training the decoder using the encoding of the corresponding decoder sequence comprises updating the attention weight for at least one token, of the one or more tokens, in the encoding of the corresponding decoder sequence.

6. The computer-implemented method of claim 1, wherein the user intent is determined using natural language processing techniques.

7. The computer-implemented method of claim 1, wherein the generating the candidate response comprises:
    generating an input encoding of the input data;
    generating an output sequence comprising a start of sequence token;
    completing the output sequence by:
        iteratively generating one or more next output sequence tokens by providing the input encoding to the machine classifier and appending each generated next output sequence token, of the one or more next output sequence tokens, to the output sequence until a subsequent generated next output sequence token comprises an end of sequence token; and
    generating the candidate response based on the completed output sequence.

8. The computer-implemented method of claim 1, wherein the response template is obtained by generating, by the machine classifier, the response template based on the user utterance, the at least one entity, and the user intent.

9. The computer-implemented method of claim 1, wherein the response template is generated in parallel with the candidate response.

10. The computer-implemented method of claim 1, wherein:
    the input data comprises a multi-turn dialog; and
    the machine classifier is trained to generate responses regarding multi-turn dialogs.

11. A device, comprising:
a processor; and
a memory in communication with the processor and storing instructions that, when read by the processor, cause the device to:
   initialize a machine classifier having a sequence to sequence network architecture, wherein the sequence to sequence network architecture comprises an encoder and a decoder;
   obtain input data comprising multi-turn dialog, wherein the multi-turn dialog comprises a conversation history and a user utterance;
   determine, using a natural language processing technique, a user intent based on the user utterance;
   determine, based on the conversation history and the user utterance, at least one entity in the user utterance;
   generate, by the machine classifier and based on the user intent and the user utterance, a candidate response;
   obtain, by the machine classifier, based on the user intent and the at least one entity, and in parallel with the generation of the candidate response, a response template;
   generate, by the machine classifier and based on the response template and the candidate response, a first response; and
   provide the first response.

12. The device of claim 11, wherein the instructions, when read by the processor, further cause the device to train the machine classifier, based on a training set comprising a plurality of encoder sequences and corresponding decoder sequences, by causing the device to:
   generate an encoding of each encoder sequence and corresponding decoder sequence of the plurality of encoder sequences and corresponding decoder sequences in the training set; and
   select a subset of the encodings and for each encoding of the subset of encodings:
      append an informative padding to the encoding;
      prepend a start of sequence token to the encoding of the encoder sequence;
      append an end of sequence token to the encoding of the corresponding decoder sequence;
      train the encoder using the encoding of the encoder sequence; and
      train the decoder using the encoding of the corresponding decoder sequence.

13. The device of claim 12, wherein each encoding comprises one or more tokens and an attention weight for each of the one or more tokens.

14. The device of claim 13, wherein the training the encoder using the encoding of the encoder sequence comprises updating the attention weight for at least one token, of the one or more tokens, in the encoding of the encoder sequence.

15. The device of claim 13, wherein the training the decoder using the encoding of the corresponding decoder sequence comprises updating the attention weight for at least one token, of the one or more tokens, in the encoding of the corresponding decoder sequence.

16. The device of claim 11, wherein the instructions, when read by the processor, further cause the device to generate the candidate response by causing the device to:
   generate an input encoding of the input data;
   generate an output sequence comprising a start of sequence token;
   complete the output sequence by:
      iteratively generating one or more next output sequence tokens by providing the input encoding to the machine classifier and appending each generated next output sequence token, of the one or more next output sequence tokens, to the output sequence until a subsequent generated next output sequence token comprises an end of sequence token; and
   generate the candidate response based on the completed output sequence.

17. The device of claim 11, wherein the instructions, when read by the processor, further cause the device to obtain the response template by causing the device to generate, using the machine classifier, the response template based on the user utterance, the at least one entity, and the user intent.

18. A non-transitory machine-readable medium storing instructions that, when executed by one or more processors, cause the one or more processors to perform steps comprising:
   initializing a machine classifier having a sequence to sequence network architecture, wherein the sequence to sequence network architecture comprises an encoder and a decoder;
   training the machine classifier, based on a training set comprising a plurality of encoder sequences and corresponding decoder sequences, by:
      generating an encoding of each encoder sequence and corresponding decoder sequence of the plurality of encoder sequences and corresponding decoder sequences in the training set; and
      selecting a subset of the encodings and for each encoding of the subset of encodings:
         appending an informative padding to encoding;
         prepending a start of sequence token to the encoding of the encoder sequence;
         appending an end of sequence token to the encoding of the corresponding decoder sequence;
         training the encoder using the encoding of the encoder sequence; and
         training the decoder using the encoding of the corresponding decoder sequence;
   obtaining input data comprising a conversation history and a user utterance;
   determining a user intent based on the user utterance;
   determining, based on the conversation history and the user utterance, at least one entity in the user utterance;
   generating, by the machine classifier and based on the user intent and the user utterance, a candidate response;
   obtaining, by the machine classifier and based on the user intent and the at least one entity, a response template;
   generating, by the machine classifier and based on the response template and the candidate response, a first response; and
   providing the first response.

19. The non-transitory machine-readable medium of claim 18, wherein the user intent is determined using natural language processing techniques.

20. The non-transitory machine-readable medium of claim 18, wherein the instructions, when executed by one or more processors, further cause the one or more processors to generate the candidate response by performing steps comprising:
   generating an input encoding of the input data;
   generating an output sequence comprising a start of output sequence token;

completing the output sequence by:
  iteratively generating one or more next output sequence tokens by providing the input encoding to the machine classifier and appending each generated next output sequence token, of the one or more next output sequence tokens, to the output sequence until a subsequent generated next output sequence token comprises an end of output sequence token; and
generating the candidate response based on the completed output sequence.

* * * * *